United States Patent
Sgraja et al.

(10) Patent No.: US 8,817,934 B2
(45) Date of Patent: Aug. 26, 2014

(54) SYSTEM AND METHOD FOR SYNCHRONIZATION TRACKING IN AN IN-BAND MODEM

(75) Inventors: Christian Sgraja, Neu-Ulm (DE); Christian Bernhard Pietsch, Nuremberg (DE); Marc W Werner, Heroldsberg (DE); Christoph A Joetten, Wadern (DE)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 13/190,909

(22) Filed: Jul. 26, 2011

(65) Prior Publication Data

US 2012/0027148 A1    Feb. 2, 2012

Related U.S. Application Data

(60) Provisional application No. 61/368,624, filed on Jul. 28, 2010.

(51) Int. Cl.
*H04L 7/04* (2006.01)
*G10L 19/00* (2013.01)
*H04B 1/7085* (2011.01)

(52) U.S. Cl.
CPC ............ *H04L 7/042* (2013.01); *G10L 19/0019* (2013.01); *H04L 7/043* (2013.01); *H04B 1/7085* (2013.01)
USPC ....................................... 375/368

(58) Field of Classification Search
USPC .......... 375/142, 149, 150, 364, 365, 368, 371
See application file for complete search history.

(56) References Cited

U.S. PATENT DOCUMENTS

| | | | |
|---|---|---|---|
| 5,280,538 A | 1/1994 | Kataoka et al. | |
| 5,727,018 A | 3/1998 | Wolf et al. | |
| 5,732,113 A | 3/1998 | Schmidl et al. | |
| 5,933,468 A | 8/1999 | Kingdon | |
| 6,169,763 B1 | 1/2001 | Woodward et al. | |
| 6,711,221 B1 | 3/2004 | Belotserkovsky et al. | |
| 6,961,352 B2 | 11/2005 | Bouquier et al. | |
| 7,801,260 B2 | 9/2010 | Du et al. | |
| 2004/0208248 A1 | 10/2004 | Sarmavuori | |
| 2008/0025386 A1* | 1/2008 | Desset et al. | 375/239 |
| 2009/0306976 A1 | 12/2009 | Joetten et al. | |
| 2012/0027135 A1 | 2/2012 | Sgraja et al. | |

FOREIGN PATENT DOCUMENTS

| | | |
|---|---|---|
| JP | H04220831 A | 8/1992 |
| JP | 2002208879 A | 7/2002 |
| JP | 2003283368 A | 10/2003 |
| JP | 2003536116 A | 12/2003 |
| WO | 0199295 A2 | 12/2001 |

(Continued)

OTHER PUBLICATIONS

3GPP TS 26.267 V.10.0.0 (Mar. 2011), 3rd Generation Partnership Project; Technical Specification Group Services and System Aspects; eCall Data Transfer; In-band modem solution; General description (Release 10).

(Continued)

*Primary Examiner* — Kevin Kim
(74) *Attorney, Agent, or Firm* — Austin Rapp & Hardman

(57) ABSTRACT

Processing the synchronization of an inband modem to detect sample slip conditions is disclosed. Decision logic reliably detects the sample slip condition while minimizing the number of false alarms.

19 Claims, 20 Drawing Sheets

(56) References Cited

FOREIGN PATENT DOCUMENTS

| WO | 03045026 A1 | 5/2003 |
|---|---|---|
| WO | 2009149349 A1 | 12/2009 |
| WO | WO 2009149346 | 12/2009 |

OTHER PUBLICATIONS

3GPP TS 26.268 V.10.0.0 (Mar. 2011), 3rd Generation Partnership Project; Technical Specification Group Services and System Aspects; eCall Data Transfer; In-band modem solution; ANSI-C reference code (Release 10).

3GPP TS 26.269 V.10.0.0 (Mar. 2011), 3rd Generation Partnership Project; Technical Specification Group Services and System Aspects; eCall Data Transfer; In-band modem solution; Conformance testing (Release 10).

QUALCOMM Incorporated, "Discussion of eCall synchronization tracking solutions," 3GPP TSG SA4 #60, Tdoc S4-100568, Aug. 16-20, 2010, Erlangen, Germany, pp. 1-6.

Werner, QUALCOMM Germany, "The 3GPP-endorsed eCall In-band Modem Solution," Telematics & the Enviroment Conference, Gothenburg, Dec. 10-11, 2008, Germany, pp. 1-24.

Al-Subbagh M N et al., "Optimum patterns for frame alignment", IEE Proceedings F. Communications, Radar & Signalprocessing, Institution of Electrical Engineers. Stevenage, GB, vol. 135, No. 6, Dec. 1, 1988, pp. 594-603, XP000008973, ISSN: 0956-375.

"3rd Generation Partnership Project; Technical Specification Group Services and System Aspects; eCall data transfer ; In-band modem solution; Characterization report (Release 9)," 3GPP Standard; 3GPP TR 26.969, 3rd Generation Partnership Project (3GPP), Mobile Competence Centre, No. V9.0.0, Dec. 10, 2009, pp. 1-60, XP050400680, 650, Route Des Lucioles; F-06921 Sophia-Antipolis Cedex ; France paragraph [5.13].

International Search Report and Written Opinion—PCT/US2011/045570—ISA/EPO—Nov. 21, 2011.

Lui G L Ed—Institute of Electrical and Electronics Engineers: "PPM symbol synchronization in random data" Military Communications in a Changing World. McLean, VA., Nov. 4-7, 1991; [Proceedings of the Military Communications Conference. (MILCOM)], New York, IEEE, US, vol. -, Nov. 4, 1991, pp. 1047-1053, XP010042306, DOI:10.1109/MILCOM.1991.258430 ISBN: 978-0-87942-691-0.

* cited by examiner

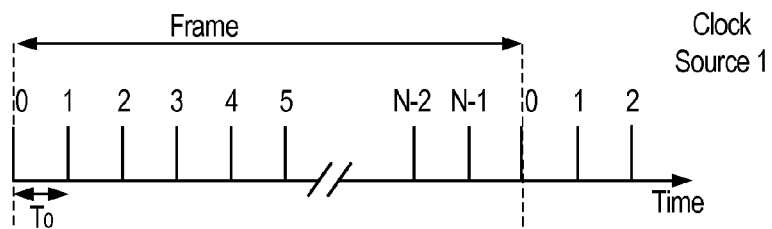
FIG. 4
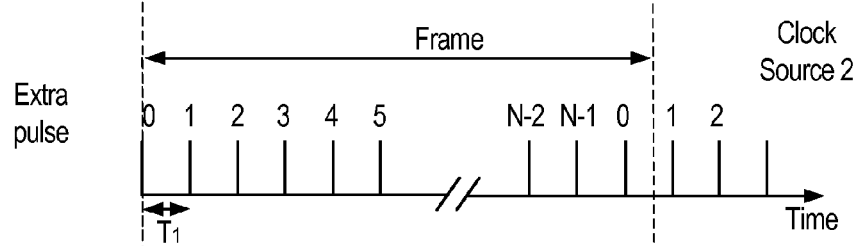
FIG. 5
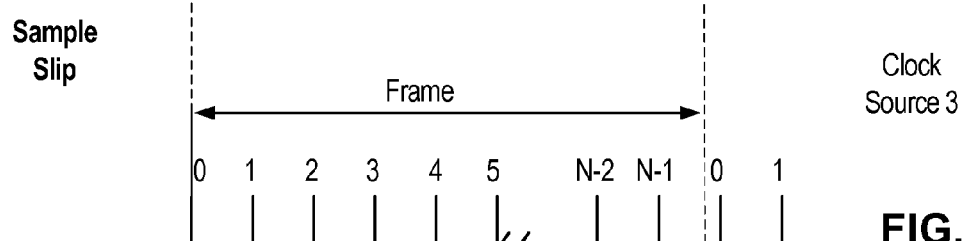
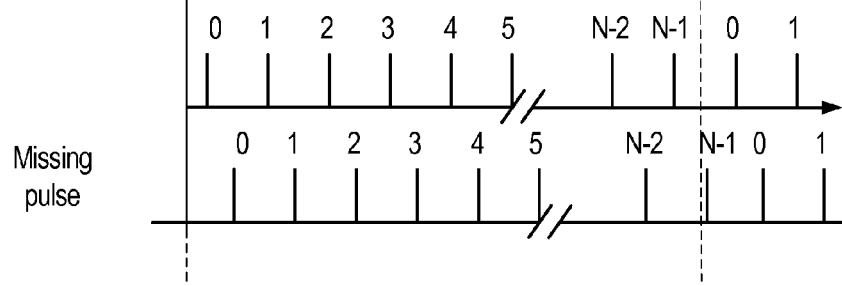
FIG. 6A
FIG. 6B
FIG. 6C

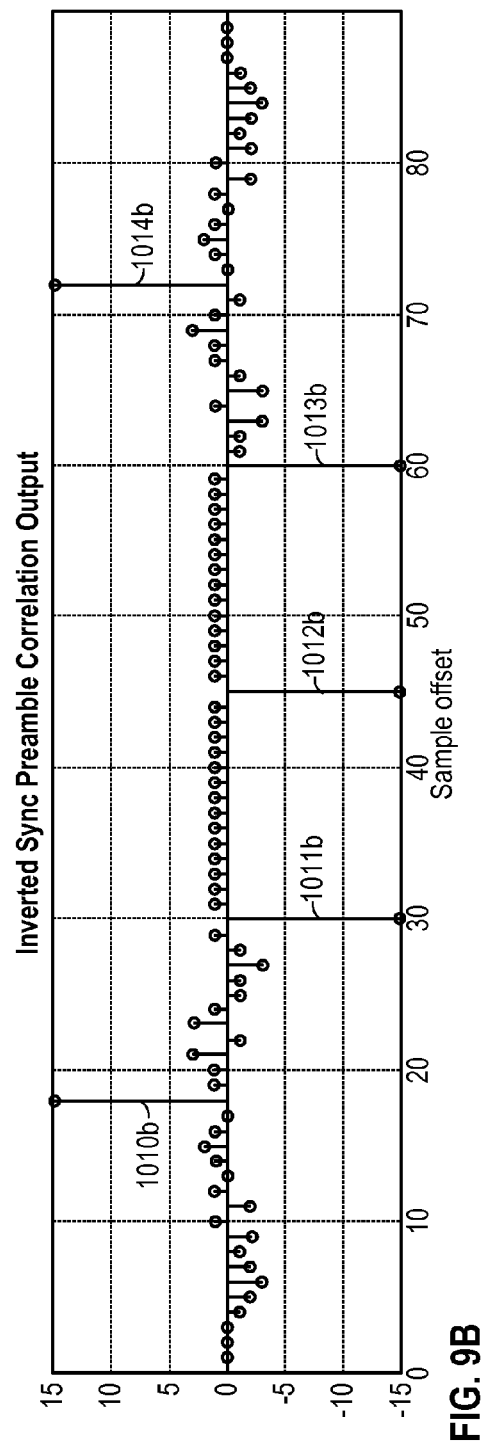

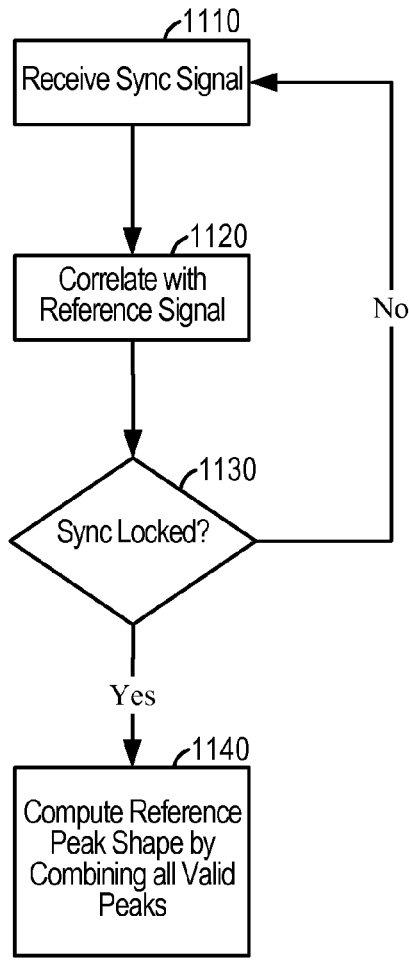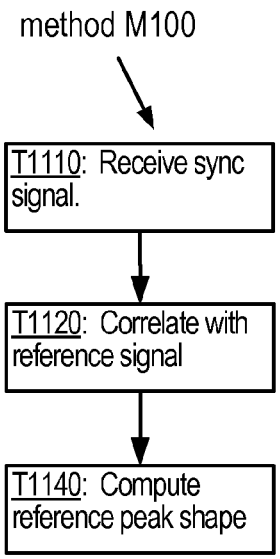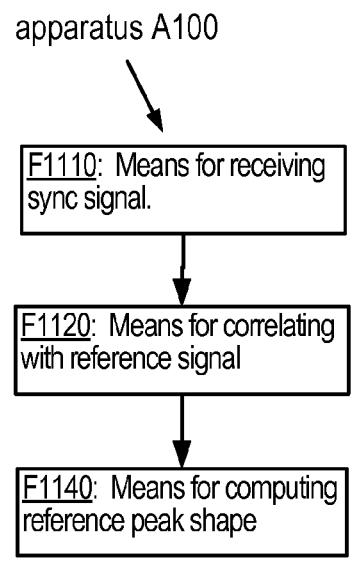
FIG. 11A
FIG. 11B
FIG. 11C

SYSTEM AND METHOD FOR SYNCHRONIZATION TRACKING IN AN IN-BAND MODEM

RELATED APPLICATIONS

I. Claim of Priority

A claim of priority is made to the following U.S. Provisional Applications: No. 61/368,624 entitled "SYSTEM AND METHOD FOR SYNCHRONIZATION TRACKING IN AN IN-BAND MODEM" filed Jul. 28, 2010, and assigned to the assignee hereof and hereby expressly incorporated by reference herein.

II. Reference to Co-Pending Applications for Patent

Related co-pending U.S. Patent Applications include:

Ser. No. 12/477,544 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof.

Ser. No. 12/477,561 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof.

Ser. No. 12/477,574 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee.

Ser. No. 12/477,590 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof.

Ser. No. 12/477,608 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof.

Ser. No. 12/477,626 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof.

Ser. No. 12/816,197 entitled "SYSTEM AND METHOD FOR SUPPORTING HIGHER-LAYER PROTOCOL MESSAGING IN AN IN-BAND MODEM" filed Jun. 15, 2010, and assigned to the assignee hereof.

Ser. No. 12/816,252 entitled "SYSTEM AND METHOD FOR SUPPORTING HIGHER-LAYER PROTOCOL MESSAGING IN AN IN-BAND MODEM" filed Jun. 15, 2010, and assigned to the assignee hereof.

BACKGROUND

I. Field

The present disclosure generally relates to data transmission over a speech channel. More specifically, the disclosure relates to a system and method for supporting synchronization tracking through a speech codec (in-band) in a communication network.

II. Description of Related Art

Transmission of speech has been a mainstay in communications systems since the advent of the fixed line telephone and wireless radio. Advances in communications systems research and design have moved the industry toward digital based systems. One benefit of a digital communication system is the ability to reduce required transmission bandwidth by implementing compression on the data to be transferred. As a result, much research and development has gone into compression techniques, especially in the area of speech coding. A common speech compression apparatus is a "vocoder" and is also interchangeably referred to as a "speech codec" or "speech coder." The vocoder receives digitized speech samples and produces collections of data bits known as "speech packets". Several standardized vocoding algorithms exist in support of the different digital communication systems which require speech communication, and in fact speech support is a minimum and essential requirement in most communication systems today. The 3rd Generation Partnership Project 2 (3GPP2) is an example standardization organization which specifies the IS-95, CDMA2000 1xRTT (1× Radio Transmission Technology), CDMA2000 EV-DO (Evolution-Data Optimized), and CDMA2000 EV-DV (Evolution-Data/Voice) communication systems. The 3rd Generation Partnership Project (3GPP) is another example standardization organization which specifies the GSM (Global System for Mobile Communications), UMTS (Universal Mobile Telecommunications System), HSDPA (High-Speed Downlink Packet Access), HSUPA (High-Speed Uplink Packet Access), HSPA+ (High-Speed Packet Access Evolution), and LTE (Long Term Evolution). The VoIP (Voice over Internet Protocol) is an example protocol used in the communication systems defined in 3GPP and 3GPP2, as well as others. Examples of vocoders employed in such communication systems and protocols include ITU-T G.729 (International Telecommunications Union), AMR (Adaptive Multirate Speech Codec), and EVRC (Enhanced Variable Rate Codec Speech Service Options 3, 68, 70).

Information sharing is a primary goal of today's communication systems in support of the demand for instant and ubiquitous connectivity. Users of today's communication systems transfer speech, video, text messages, and other data to stay connected. New applications being developed tend to outpace the evolution of the networks and may require upgrades to the communication system modulation schemes and protocols. In some remote geographical areas only speech services may be available due to a lack of infrastructure support for advanced data services in the system. Alternatively, users may choose to only enable speech services on their communications device due to economic reasons. In some countries, public services support is mandated in the communication network, such as Emergency 911 (E911) or eCall. In these emergency application examples, fast data transfer is a priority but not always realistic especially when advanced data services are not available at the user terminal. Previous techniques have provided solutions to transmit data through a speech codec, but these solutions are only able to support low data rate transfers due to the coding inefficiencies incurred when trying to encode a non-speech signal with a vocoder.

Transmitting data over a speech channel is commonly referred to as transmitting data "in-band", wherein the data is incorporated into one or more speech packets output from the speech codec. Several techniques use audio tones at predetermined frequencies within the speech frequency band to represent the data. Using predetermined frequency tones to transfer data through speech codecs, especially at higher data rates, is unreliable due to the vocoders employed in the systems. The vocoders are designed to model speech signals using a limited number of parameters. The limited parameters are insufficient to effectively model the tone signals. The ability of the vocoders to model the tones is further degraded when attempting to increase the transmission data rate by changing the tones quickly. This affects the detection accuracy and results in the need to add complex schemes to minimize the data errors which in turn further reduces the overall data rate of the communication system. Therefore, a need arises to efficiently and effectively transmit data through a speech codec in a communication network.

An efficient in-band modem is described in detail in U.S. patent application Ser. No. 12/477,544, and assigned to the assignee hereof The in-band modem allows information such as emergency information in an eCall application to be sent from a source to a destination and for the destination to send a low layer acknowledgement at the in-band modem layer indicating proper receipt of the transmitted information.

An in-band modem with a higher layer acknowledgement protocol is described in detail in U.S. patent application Ser. No. 12/816,252.

A phenomenon known as a sample slip may occur between a source and destination communications terminal, for example in cases where a destination communication terminal is connected to an analog line which implements re-sampling or alternatively due to drift between two different clock sources. This can potentially cause loss of synchronization in an in-band modem. Other potential sources of sample slip may include buffer overrun or underrun conditions which may be caused by system handoff or implementation of jitter buffers.

Accordingly it would be advantageous to provide an improved system for communicating over a speech channel that supports synchronization tracking.

SUMMARY

Embodiments disclosed herein address the above stated needs by synchronizing and tracking sample slip conditions in an in-band modem.

In one embodiment, a method for identifying a sample slip in the transmission channel of an in-band modem comprises receiving a synchronization sequence, correlating the received synchronization sequence with a reference signal, computing a plurality of correlation peaks based on the repeating pseudorandom sequence when synchronization is locked at a receiver; and identifying the sample slip based on the correlation peaks.

In another embodiment, a method for identifying a sample slip in the transmission channel of an in-band modem comprises receiving a data bit, correlating the received data bit with a reference signal and identifying a sample slip based on the correlating.

BRIEF DESCRIPTION OF THE DRAWINGS

The aspects and the attendant advantages of the embodiments described herein will become more readily apparent by reference to the following detailed description when taken in conjunction with the accompanying drawings wherein:

FIG. 4 is a diagram of an embodiment of the timing of a first clock source.

FIG. 5 is a diagram of an embodiment of the timing of a second clock source which has a higher frequency than a first clock source resulting in an sample slip (extra pulse) condition.

FIG. 6A is a diagram of an embodiment of the timing of a second clock source which has a lower frequency than a first clock source.

FIG. 6B is a diagram of an embodiment of the timing of a second clock source which has a lower frequency than a first clock source and is drifting in time relative to the first clock source.

FIG. 6C is a diagram of an embodiment of the timing of a second clock source which has a lower frequency than a first clock source and is drifting in time relative to the first clock source to a point resulting in a sample slip (missing pulse) condition.

FIG. 9A is a diagram of a second embodiment of a synchronization preamble sequence.

FIG. 9B is a graph of the correlation output for a second embodiment of a synchronization preamble sequence.

FIG. 11A is a flowchart of the preparation for downlink sample slip detection.

FIG. 11B is a flowchart of a method M100 of the preparation for downlink sample slip detection.

FIG. 11C is a flowchart of a first set of means of an apparatus A100 according to a first configuration of the preparation for downlink sample slip detection.

DETAILED DESCRIPTION

Figure 1:
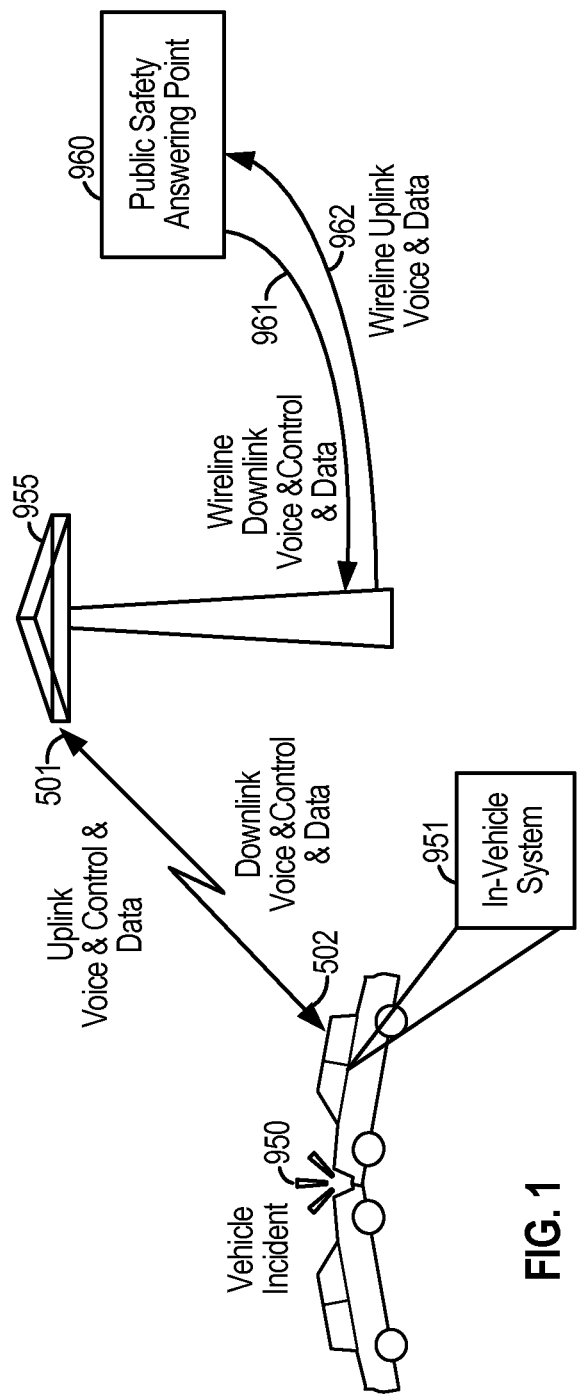
FIG. 1 is a diagram of an embodiment of a telematics emergency call system.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

In a typical application a system, method, or apparatus is used to control transmissions from a source or destination terminal in an in-band communication system. The system, method, or apparatus may include protocols to transmit and receive data between the source and destination terminals. The protocols may include signals to synchronize the data transferred between the source and destination terminals. The signals may not adequately synchronize the data due to differences in sampling timing (e.g. caused by different clocking mechanisms, handoff between cell base stations, or jitter buffer control) between source and destination terminals which may result in additional or lost samples and/or incorrect sample indices for a predetermined amount (e.g. frame) of data. Alternatively, the signals may correctly synchronize the data initially, but sync may be lost after some time. A system, method, or apparatus may be used to enhance and/or detect and track the synchronization signals.

FIG. 1 represents a typical example of an emergency call (eCall) system. A vehicle incident 950 is shown as an accident between two vehicles. Other suitable examples for vehicle incident 950 include a multiple vehicle accident, single vehicle accident, single vehicle flat tire, single vehicle engine malfunction or other situations where the vehicle malfunctions or the user is in need of assistance. The In-Vehicle System (IVS) 951 is located in one or more of the vehicles involved in the vehicle incident 950 or may be located on the user himself. The In-Vehicle System 951 may be comprised of a source and destination terminal. The In-Vehicle System 951 communicates over a wireless channel which may be comprised of an uplink communications channel 501 and downlink communications channel 502. A request for data transmission may be received by the In-Vehicle System through the communications channel or may be automatic or manually generated at the In-Vehicle System. A wireless tower 955 receives the transmission from the In-Vehicle System 951 and interfaces to a wireline network comprised of a wireline uplink 962 and wireline downlink 961. A suitable example of a wireless tower 955 is a cellular telephone communications tower comprised of antennas, transceivers, and backhaul equipment, all well-known in the art, for interfacing to the wireless uplink 501 and downlink 502. The wireline network interfaces to a Public Safety Answering Point (PSAP) 960, where emergency information transmitted by the In-Vehicle System 951 may be received and control and data transmitted. Alternatively, the PSAP 960 may be integrated in a Mobile Switching Center eliminating the wireline network interface. The Public Safety Answering Point 960 may be comprised of the destination terminal 600 described herein. The communication between the In-Vehicle System 951 and the Public Safety Answering Point 960 may be accomplished by transmit and receive protocols incorporating a synchronization enhancement and/or tracking scheme. Other suitable examples for vehicle incident 950 may also include vehicle inspection, servicing, diagnostic or other situations where in-band data transfer from a vehicle may occur. In this case the Public Safety Answering Point (PSAP) 960 may be replaced by a destination terminal server.

Figure 2:
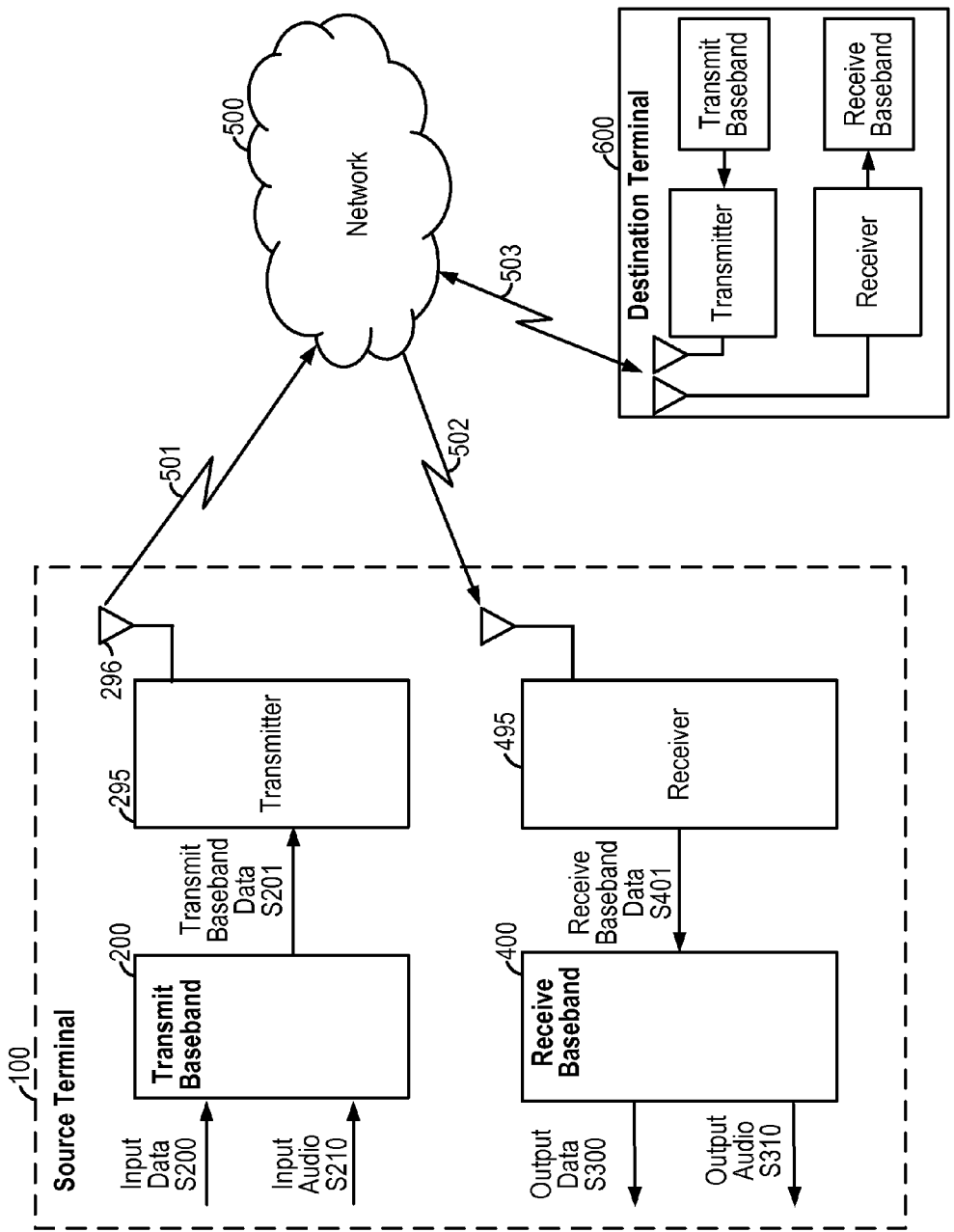
FIG. 2 is a diagram of an embodiment of source and destination terminals which use an in-band modem to transmit messages through a speech codec in a wireless communication network.

FIG. 2 shows an embodiment of an in-band data communication system as might be implemented within a wireless source terminal 100. Input data S200 is processed by Transmit Baseband 200 and output as Transmit Baseband Data S201. The processing of Transmit Baseband 200 may include message formatting, modulation, and vocoder encoding. Input data S200 may include user interface (UI) information, user position/location information, time stamps, equipment sensor information, or other suitable data. Transmit Baseband Data S201 is input to Transmitter 295 and antenna 296 to be transmitted over the communication channel 501. Data is received over communication channel 502 by Receiver 495 and output as Receive Baseband Data S401. The Receive Baseband Data S401 is input to Receive Baseband 400 to be processed and output as Output Data S300 and Output Audio 5310. The processing of Receive Baseband 400 may include vocoder decoding, timing recovery, demodulation, message deformatting, and synchronization detection and control. The source terminal 100 communicates with the destination terminal 600 through the communication channels 501 and 502, network 500, and communication channel 503. Examples of suitable wireless communication systems include cellular telephone systems operating in accordance with Global System for Mobile Communications (GSM), Third Generation Partnership Project Universal Mobile Telecommunications System (3GPP UMTS), Third Generation Partnership Project 2 Code Division Multiple Access (3GPP2 CDMA), Time Division Synchronous Code Division Multiple Access (TD-SCDMA), and Worldwide Interoperability for Microwave Access (WiMAX) standards. One skilled in the art will recognize that the techniques described herein may be equally applied to an in-band data communication system that does not involve a wireless channel. The communication network 500 includes any combination of routing and/or switching equipment, communications links and other infrastructure suitable for establishing a communication link between the source terminal 100 and destination terminal 600. For example, communication channel 503 may not be a wireless link. The source terminal 100 normally functions as a voice communication device.

Figure 3A:
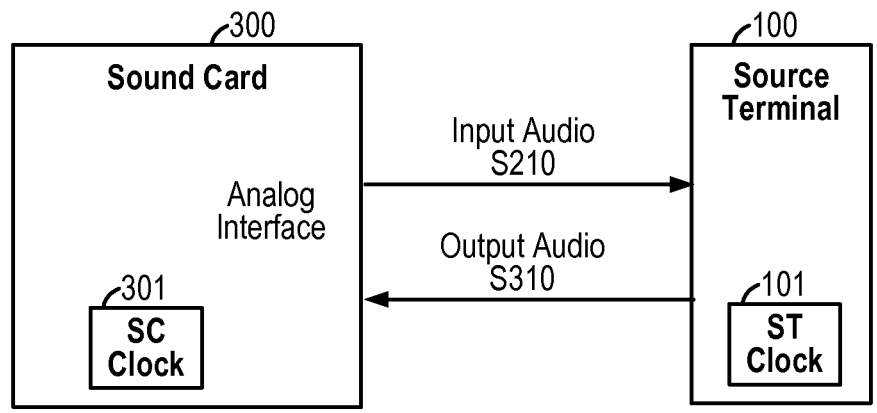
FIG. 3A is a diagram of an embodiment of a source terminal interfaced to a sound card through an analog interface.
Figure 3B:
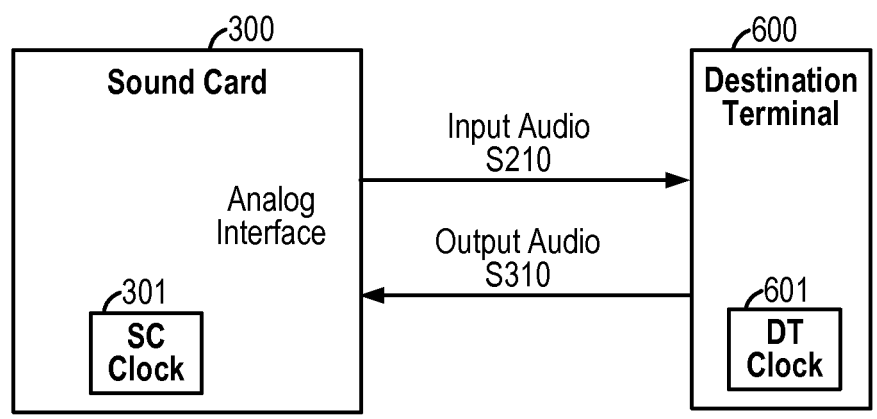
FIG. 3B is a diagram of an embodiment of a destination terminal interfaced to a sound card through an analog interface.

FIG. 3A shows an example configuration illustrating separate sample clocking mechanisms between a Source Terminal 100 and a sound card 300, wherein an audio input signal S210 and audio output signal S310 interfaces to the sound card 300 by an analog interface. The ST Clock 101 is a clock generator in the Source Terminal 100 and may be used to drive the sample rate of, for example, an analog to digital converter for the audio signal S210. The SC Clock 301 is a clock generator in the Sound Card 300, separate from the Source terminal 100, and likewise may be used to drive the sample rate of an analog to digital converter. FIG. 3B shows a similar configuration for a Destination terminal 600, wherein the DT Clock 601 is a clock generator in the Destination Terminal 600.

FIG. 4 shows an example clock signal, Clock Source 1, wherein the pulses are separated by period $T_0$. In the figure, N pulses are shown over a predetermined period (e.g. a frame).

FIG. 5 shows another example clock signal, Clock Source 2, wherein the pulses are separated by period $T_1$. In this example, $T_1$ is smaller than $T_0$ of Clock Source 1 (i.e. Clock Source 2 is a higher frequency clock than Clock Source 1). In the figure, N+1 pulse are shown over a Frame, illustrating a case where one extra pulse is present in the Frame as compared with Clock Source 1. This condition is commonly referred to as "sample stuff" or sample slip with extra pulse.

FIG. 6A shows another example clock signal, Clock Source 3, wherein the pulses are separated by period $T_2$. In this example, $T_2$ is larger than $T_0$ of Clock Source 1 (i.e. Clock Source 3 is a lower frequency clock than Clock Source 1). FIG. 6B shows a clock "drift" or "skew" condition (i.e. Clock Source 3 is drifting in time relative to Clock Source 1) which may exist when the Frame is considered locked to the Clock Source 1 timing, but not locked to the Clock Source 3 timing. FIG. 6C shows a further clock drift condition such that the N−1 pulse is outside of the Frame boundary resulting in one less pulse in the frame as compared to Clock Source 1. This condition is commonly referred to as "sample slip". In an alternate example, a clock drift is associated with a resampling of an entire signal.

Downlink

Figure 7:
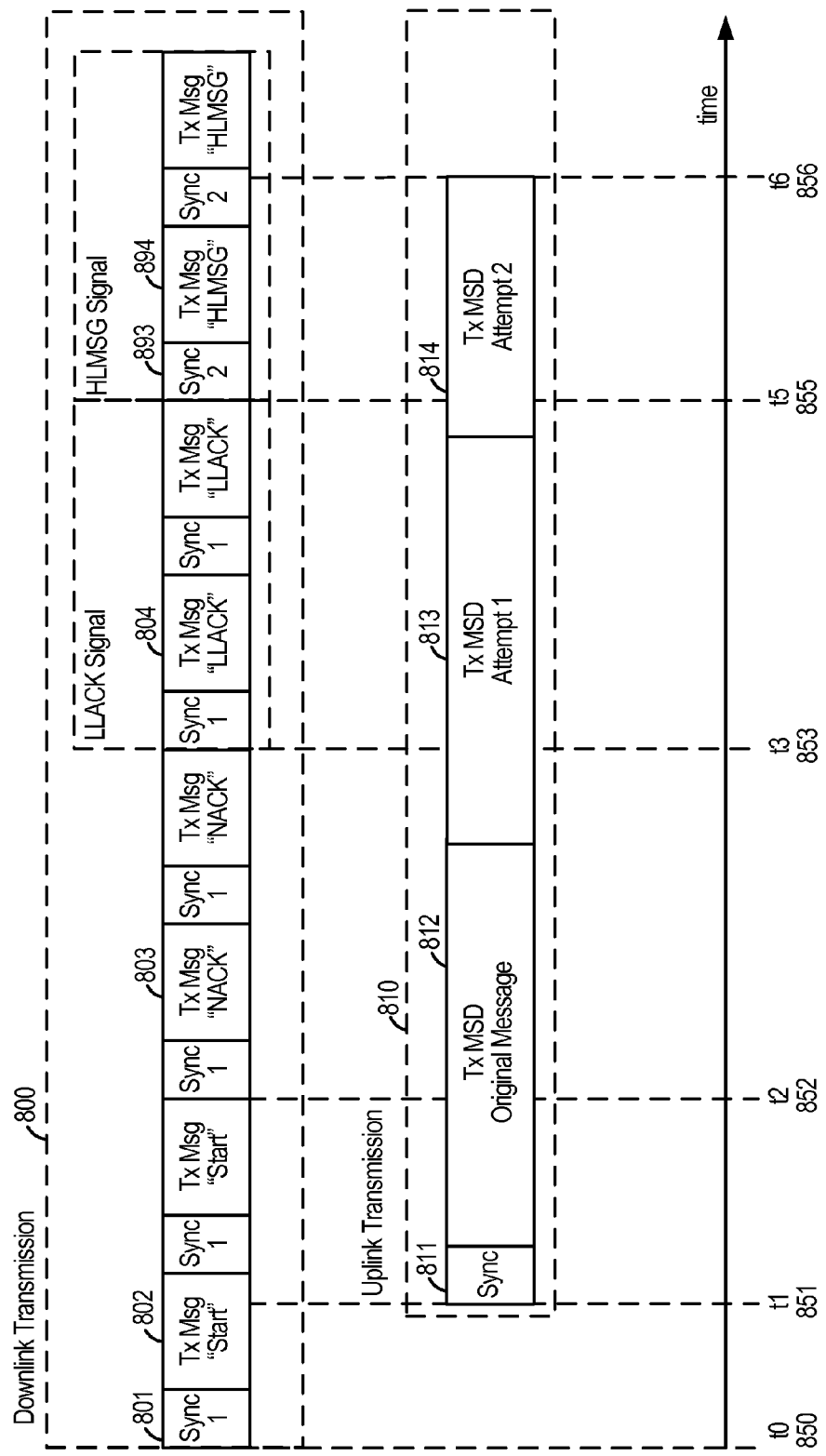
FIG. 7 is a diagram of an embodiment of an interaction of a data request sequence transmitted on a downlink in a destination communication terminal and a data response sequence transmitted on an uplink in a source communication terminal, with the interaction initiated by a destination terminal, wherein the downlink transmission is comprised of a low layer acknowledgement message and a high layer application message, and the uplink transmission is terminated based on the high layer application message.
Figure 8A:
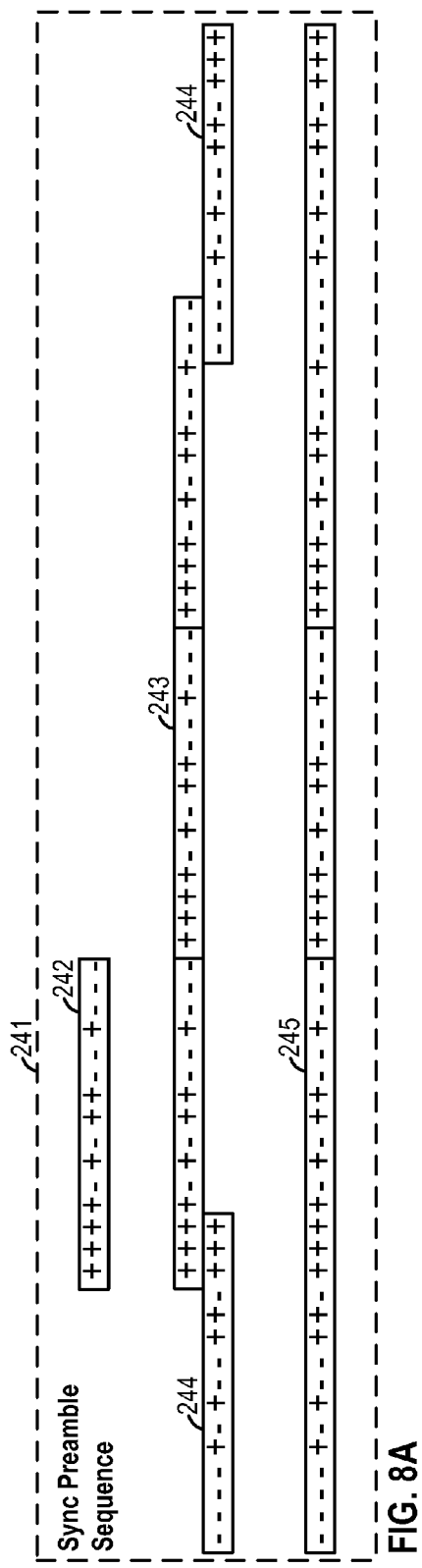
FIG. 8A is a diagram of an embodiment of a synchronization preamble sequence.
Figure 8B:
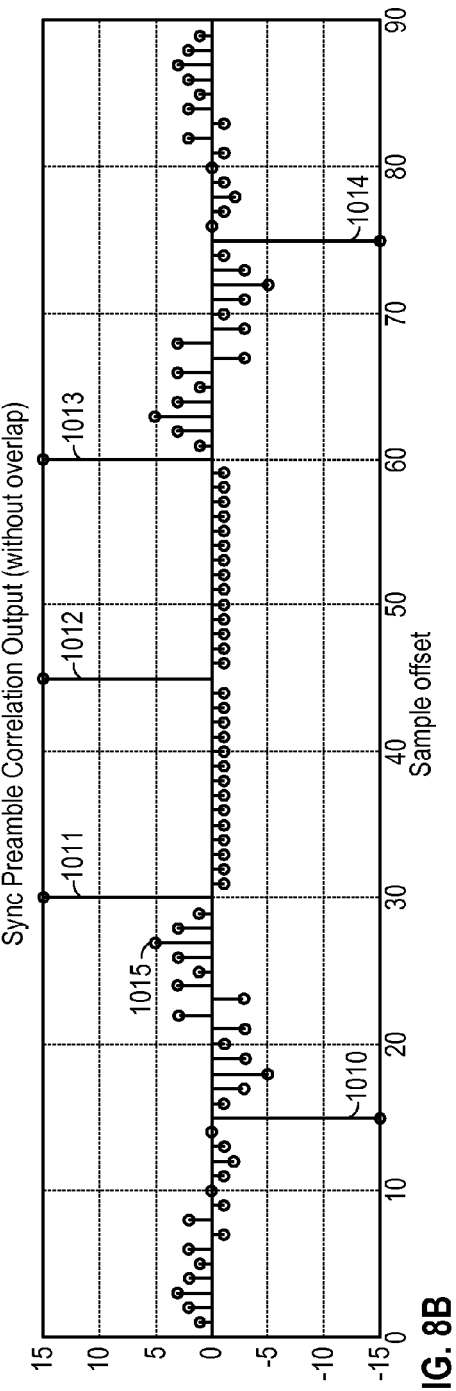
FIG. 8B is a graph of a synchronization preamble correlation output.

FIG. 7 is an example interaction diagram of the synchronization and data transmission sequences between the Source Terminal 100 and the Destination Terminal 600. The Downlink Transmission sequence 800 represents the transmission of sync and data messages from the Destination Terminal 600 to the Source Terminal 100 and the Uplink Transmission sequence 810 represents the transmission of sync and data messages from the Source Terminal 100 to the Destination Terminal 600. In this example, the Uplink Transmission sequence 810 is initiated by the Destination Terminal 600. The Downlink Transmission sequence 800 is initiated at time t0 850 by the Destination Terminal 600 with a first sync sequence 801. A suitable example of the first sync sequence 801 comprises a Sync Preamble Out as shown in FIG. 8A which results in the correlation peak pattern shown in FIG. 8B. Following the first sync sequence 801, the Destination Terminal 600 transmits a "Start" message 802 to command the Source Terminal 100 to begin transmitting its Uplink Transmission 810 sequence. The Destination Terminal 600 continues to transmit an alternating first sync 801 and "Start" message 802 and waits for a response from the Source Terminal 100. At time t1 851 the Source Terminal 100, having received the "Start" message 802 from the Destination Terminal 600, begins transmitting its own sync sequence 811. Following the sync sequence 811, the Source Terminal 100 transmits a minimum set of data or "MSD" message 812 to the Destination Terminal 600. At time t2 852 the Destination Terminal 600, having received the sync message 811 from the Source Terminal 100, begins transmitting a negative acknowledgement or "NACK" message 803 to the Source Terminal 100. The Destination Terminal 600 continues to transmit an alternating first sync 801 and "NACK" message 803 until it successfully receives the MSD message 812 from the Source Terminal 100. A suitable example of successfully receiving the MSD message 812 includes verifying a cyclic redundancy check performed on the MSD message 812. At time t3 853, the Destination Terminal 600, having successfully received the MSD message, begins transmitting a low layer acknowledgement or "LLACK signal" comprised of a first sync 801 and low layer acknowledgement "LLACK" message 804. At time t5 855, the Destination Terminal 600 begins transmitting a high layer message or "HLMSG signal" comprised of a second sync 893 and high layer message HLMSG 894. A suitable example of a second sync signal 893 is an inverted sequence to that shown in 245 ('+' and '−' polarity bits swapped) as shown in FIG. 9A which results in the alternate correlation peak pattern shown in FIG. 9B. The Source Terminal 100 may attempt to send the MSD message 812 multiple times (813, 814) until it receives the LLACK message. In alternate embodiments, the Source Terminal 100 may attempt to send the MSD message 812 multiple times (813, 814) until it receives an HLMSG message, or both LLACK and HLMSG messages. At time t6 856 the Source Terminal 100 having received the HLMSG signal from the Destination Terminal 600 discontinues transmission of the MSD message. In a suitable example, a retransmission is requested by the Destination Terminal 600 via transmitting the start messages 802 again after a predetermined number of HLMSG signals have been sent by the Destination Terminal 600. In a suitable example, the predetermined number of HLMSG signals sent by the Destination Terminal 600 is five. In a suitable example, the interaction of FIG. 7 may contain an HLMSG signal comprising second sync 893 and high layer message HLMSG 894, but no LLACK Signal (i.e. the HLMSG Signal is detected without a preceding LLACK signal).

Sync Sequence-Based Sync Tracking Demodulation

Since a sync sequence (preamble) is included with every feedback message (e.g. the START, NACK, LLACK, and HLMSG messages) in the downlink, a check may be carried out for each of the feedback messages in order to verify and track synchronization. However, the decision rule should take into account that the sync sequence is also used for distinguishing higher layer (HL) messages from lower layer (LL) messages. Therefore, ambiguities should be avoided with respect to the sign of the correlation peaks. For example, a peak search in the neighborhood of the previous position could cause ambiguities between higher layer and lower layer messages due to the low pass/band pass characteristics of the transmission channel, and becomes more important if clock drift is present.

Figure 10A:
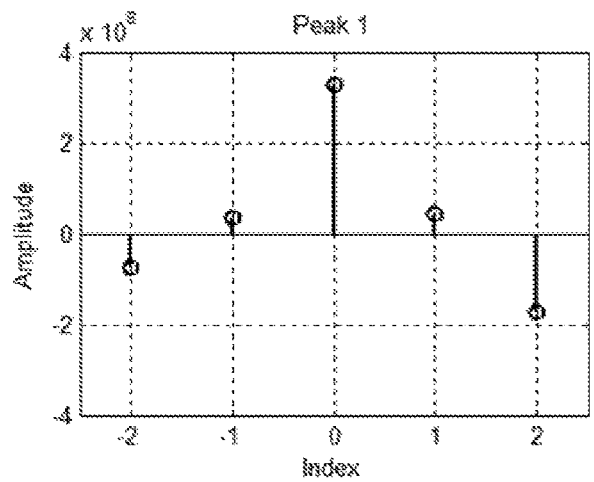
FIG. 10A is an example graph of a correlation output for the first peak of the synchronization preamble sequence of FIG. 8A.
Figure 10B:
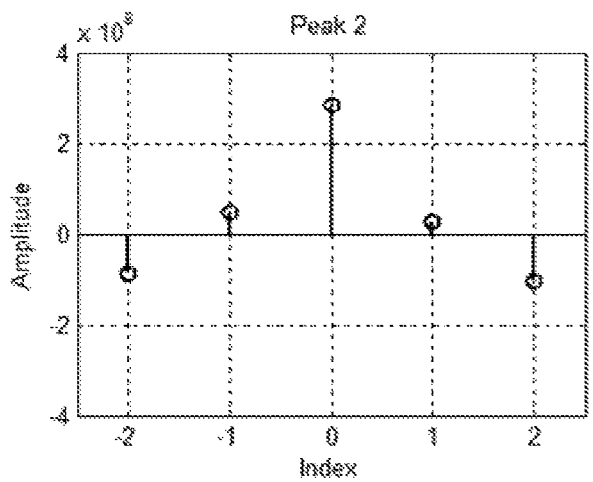
FIG. 10B is an example graph of a correlation output for the second peak of the synchronization preamble sequence of FIG. 8A.
Figure 10C:
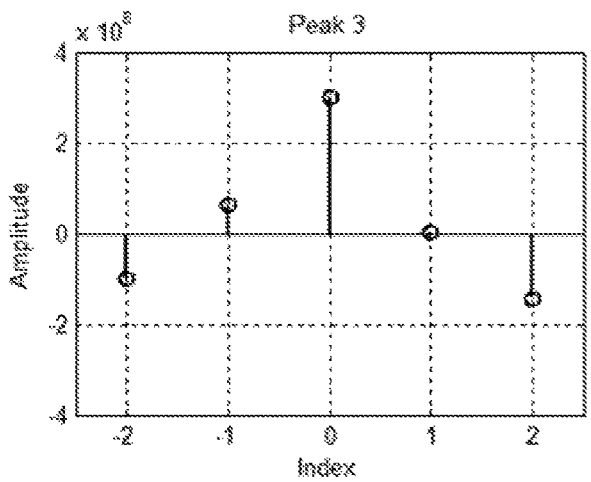
FIG. 10C is an example graph of a correlation output for the third peak of the synchronization preamble sequence of FIG. 8A.
Figure 10D:
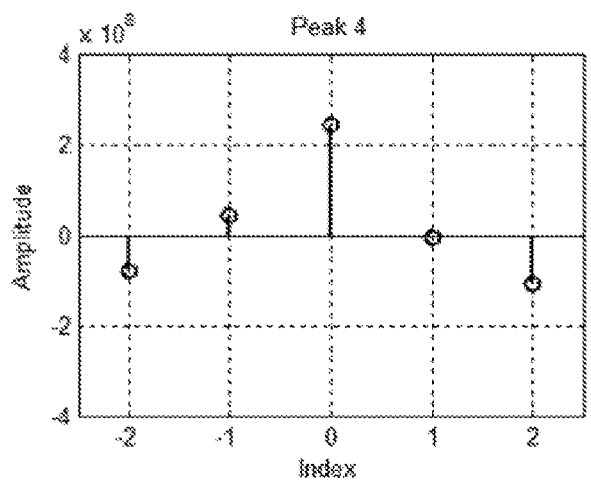
FIG. 10D is an example graph of a correlation output for the fourth peak of the synchronization preamble sequence of FIG. 8A.
Figure 10E:
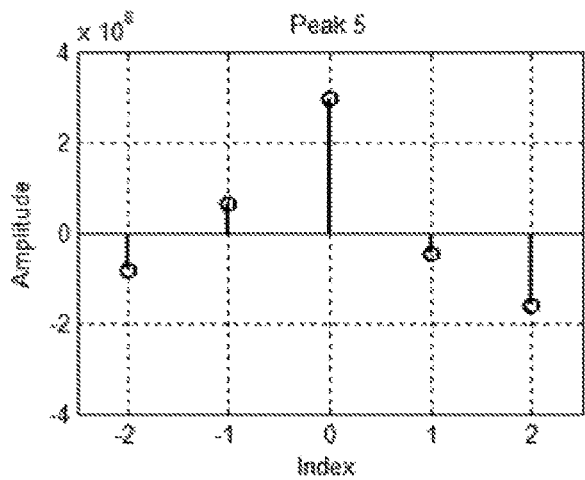
FIG. 10E is an example graph of a correlation output for the fifth peak of the synchronization preamble sequence of FIG. 8A.
Figure 10F:
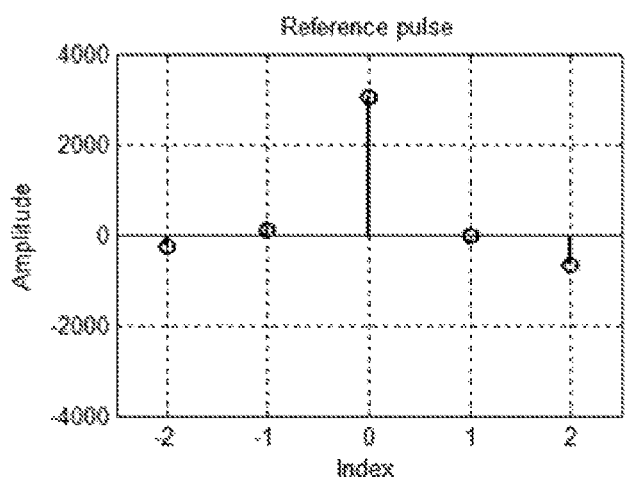
FIG. 10F is a graph of the correlation output a reference pulse comprised of a scaled sum of the five peaks of the synchronization preamble sequence of FIG. 8A.

To avoid ambiguities, a reference correlation peak shape may be computed when synchronization is locked at the downlink receiver. In a suitable example, it is determined which correlation peaks are valid at the time when synchronization is locked. Combining all valid (e.g. detected) peaks may determine a reference peak shape. In a suitable example, summing all valid peaks and scaling the result may determine a reference peak shape. Averaging all valid peaks may also determine a reference peak shape. An example length of the reference peak shape may be 5 samples where the actual desired peak is the center sample of the peak shape. FIG. 10A, 10B, 10C, 10D, and 10E show example correlation peaks for a plurality of peaks. The 5 peaks shown in FIG. 10A-10E corresponding to 5 detected peaks from the example preamble shown in FIG. 8A over 5 samples, wherein index 0 indicates the main detected peak and indices −2, −1, 1, 2 indicate the respective sample offsets from the main detected peak. Each of FIG. 10A-10E describes the peak shape of an individual peak, where the actual peak is the correlation value in the center (i.e. index 0 in the Figures). FIG. 10F shows a reference pulse comprised of a combined set (e.g. scaled sum or average) of the peaks of FIG. 10A-10E. Combining (e.g. via scaled sum or averaging) the peaks is advantageous because it tends to smooth variations that the individual peaks may observe due to distortions caused by, among other things, the speech channel. Additionally, combining over only the detected peaks results in a calculated value which is not adversely impacted by non-detected peaks. Therefore it is advantageous and preferred to perform combining (e.g. scaled sum or averaging), and to perform that combining only over the detected peaks. A wide range of samples may be tracked using this method, for example, a range of [−480, . . . +480] samples may be tracked in the downlink.

FIG. 11A shows a flowchart of an example of the processing in preparation for sample slip detection. The sync signal (e.g. 801 or 893) is received in 1110 and correlated with a local reference signal in 1120. If sync is determined as not locked, 1130, then the flow is transferred back to receiving the sync sequence 1110. If sync is determined to be locked, then a reference peak shape is computed by combining all the valid (i.e. detected) peaks in 1140.

In a suitable example, a peak may be computed from a received sync preamble and/or an inverted sync preamble. If both sync and inverted sync preambles are detected, a decision is made to determine whether the detected sync is inverted or not inverted using the following decision logic used during the tracking phase:

IF ((Number of positive sync peaks>=Number of negative sync peaks AND Positive peak cross correlation with original pulse shape>Negative peak cross correlation with original pulse shape) OR (Number of positive sync peaks>Number of negative sync peaks AND Positive peak cross correlation with original pulse shape>Scaled (e.g. divide by 2) negative peak cross correlation with original pulse shape AND Number of negative peaks at the expected position assuming no sample slip has occurred==0)) THEN valid peaks are positive ELSE IF ((Number of positive sync peaks<=Number of negative sync peaks) AND Positive peak cross correlation with original pulse shape<Negative peak cross correlation with original pulse shape) OR (Number of positive sync peaks<Number of negative sync peaks) AND (Scaled (e.g. divide by 2) positive peak cross correlation with original pulse shape<Negative peak cross correlation with original pulse shape AND Number of positive peaks at the expected position assuming no sample slip has occurred==0)) THEN valid peaks are negative.

ELSEIF (Number of positive peaks at the expected position assuming nosample slip has occurred>Number of negative peaks at the expected position assuming no sample slip has occurred) THEN valid peaks are positive.

ELSEIF (Number of negative peaks at the expected position assuming nosample slip has occurred>Number of positive peaks at the expected position assuming no sample slip has occurred) THEN valid peaks are negative.

If only one peak is detected then it is considered valid unless there have been at least as many peaks detected at the expected position.

For computation of the reference peak shape, the valid peaks may be identified according to the following synchronization algorithm. The synchronization algorithm chooses a reference peak and checks for the existence of any additional peaks at the expected positions; e.g. 1 reference peak and 4 additional peaks. In a suitable example, the detected peaks are stored in a vector; e.g. [01111] would indicate all peaks have been detected except for the first one. Depending on how many ones are in this vector, the synchronization algorithm will continue with additional tests. In a suitable example the additional tests are based on amplitude values. Following the additional tests, the synchronization algorithm decides whether it is a valid sync. If all the tests are successful; i.e. a sync preamble is marked as detected, then the vector is combined (e.g. scaled sum or averaged) over those peaks that are marked with a one in the vector. In a suitable example the peaks are combined irrespective of their amplitudes.

FIG. 11B shows a flowchart for a method M100 of an example of the processing in preparation for sample slip detection according to a first configuration. Task T1110 receives a sync signal (e.g. 801 or 893). Task T1120 correlates the received sync signal with a reference signal. Task T1140 computes a reference peak shape, where the reference peak shape is computed by combining all valid peaks.

FIG. 11C shows a block diagram of an apparatus A100. Apparatus A100 includes means F1110 for receiving a sync signal, means F1120 for correlating the received sync signal with a reference signal, and means F1140 for computing a reference peak shape, where the reference peak shape is computed by combining all valid peaks Uplink The transmit baseband 200 normally routes user speech through a vocoder, but is also capable of routing non-speech data through the vocoder in response to a request originating from the source terminal or the communication network. Routing non-speech data through the vocoder is advantageous since it eliminates the need for the source terminal to request and transmit the data over a separate communications channel. The non-speech data is formatted into messages. The message data, still in digital form, is converted into a noise-like signal comprised of pulses. The message data information is built into the pulse positions and pulse sign of the noise-like signal. The noise-like signal is encoded by the vocoder. The vocoder is not configured differently depending on whether the input is user speech or non-speech data so it is advantageous to convert the message data into a signal which can be effectively encoded by the transmission parameter set allocated to the vocoder. The encoded noise-like signal is transmitted in-band over the communication link. Because the transmitted information is built in the pulse positions of the noise-like signal, reliable detection depends on recovery of the timing of the pulses relative to the speech codec frame boundaries. To aid the receiver in detecting the in-band transmission, a predetermined synchronization signal is encoded by the vocoder prior to the transmission of message data. A protocol sequence of synchronization, control, and messages is transmitted to ensure reliable detection and demodulation of the non-speech data at the receiver.

Figure 12:
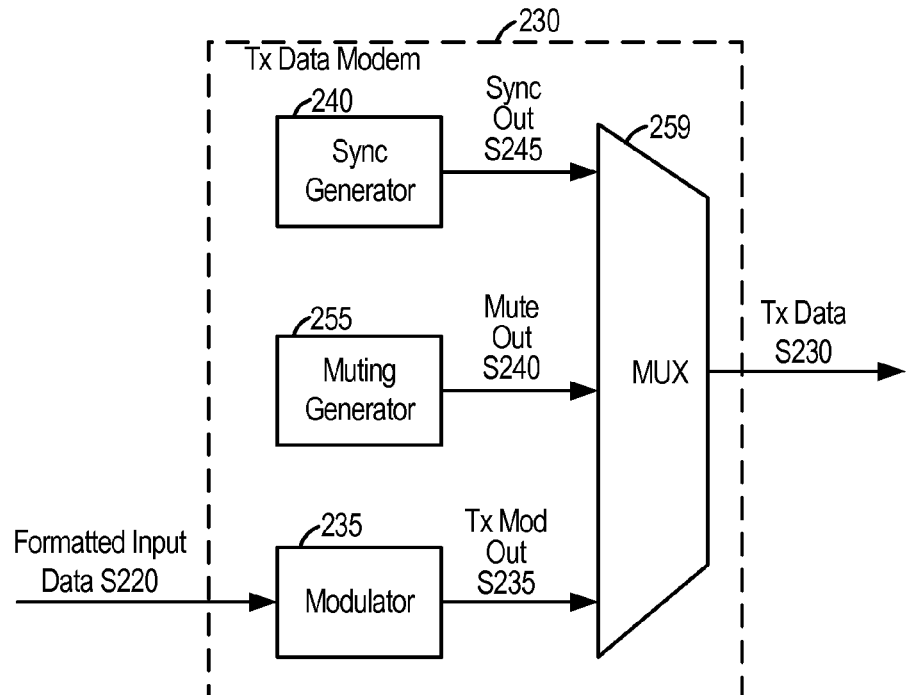
FIG. 12 is a diagram of an embodiment of a transmit data modem used in an in-band communication system.

FIG. 12 is a suitable example block diagram of a Tx data modem 230 which may reside within the Transmit Baseband 200 block shown in FIG. 2. Three signals may be multiplexed in time through mux 259 onto the Tx data S230 output signal, from which the Transmit Baseband Data S201 in FIG. 2 is based upon; Sync Out S245, Mute Out S240, and Tx Mod Out S235. It should be recognized that different orders and combinations of signals Sync Out S245, Mute Out S240, and Tx Mod Out S235 may be output onto Tx data S230. For example, Sync Out S245 may be sent prior to each Tx Mod Out S235 data segment. Or, Sync Out S245 may be sent once prior to a complete Tx Mod Out S235 with mute Out S240 sent between each Tx Mod Out S235 data segment. In FIG. 12, Formatted Input Data S220 may be based upon Input Data S200.

Sync Sequence-Based Sync Tracking Modulation

Figure 13:
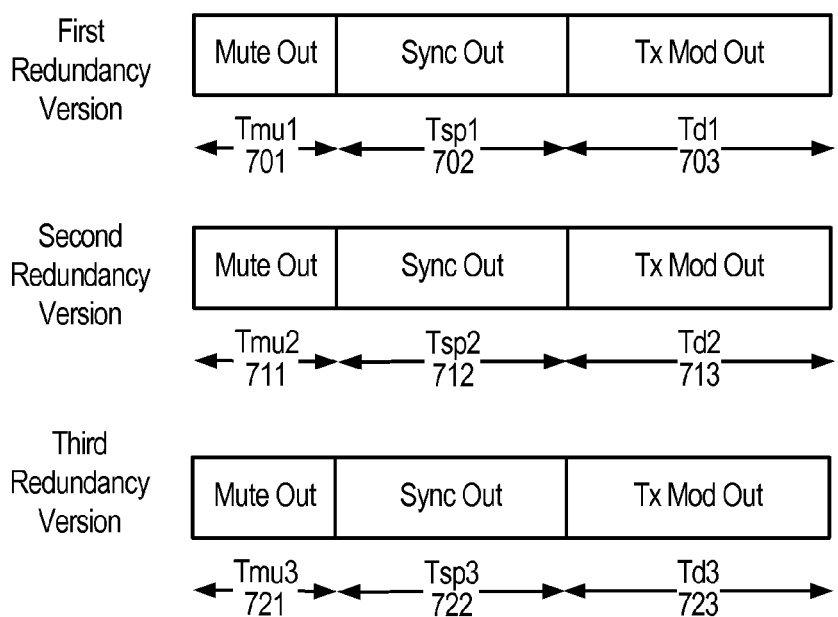
FIG. 13 is a diagram of an embodiment of a composite synchronization and transmit data message format comprising a first, second, and third redundancy version.
Figure 14A:
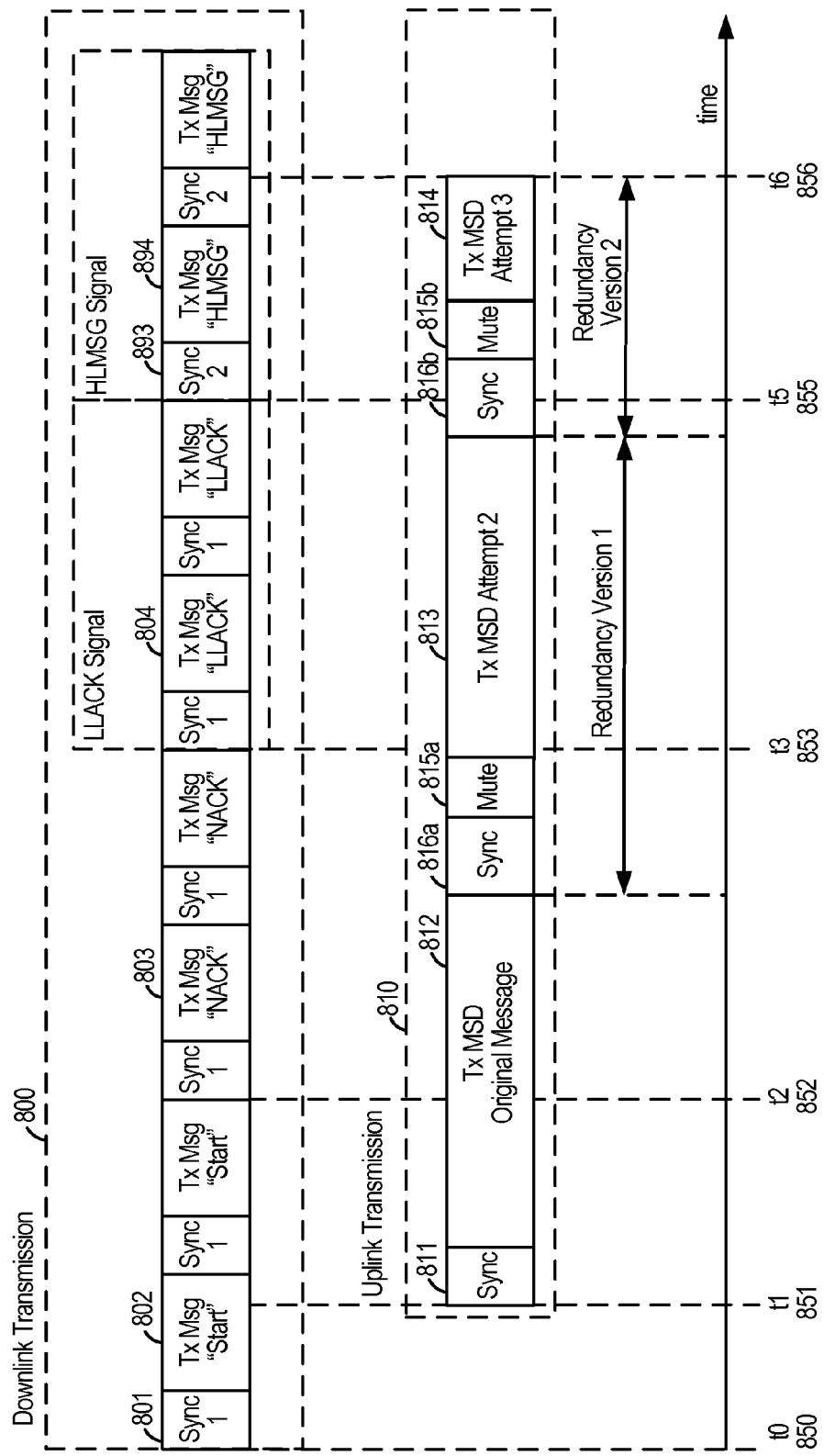
FIG. 14a is a diagram of an embodiment of an interaction of a data request sequence transmitted on a downlink in a destination communication terminal and a data response sequence transmitted on an uplink in a source communication terminal with mute, sync, and data comprising each redundancy version.
Figure 14B:
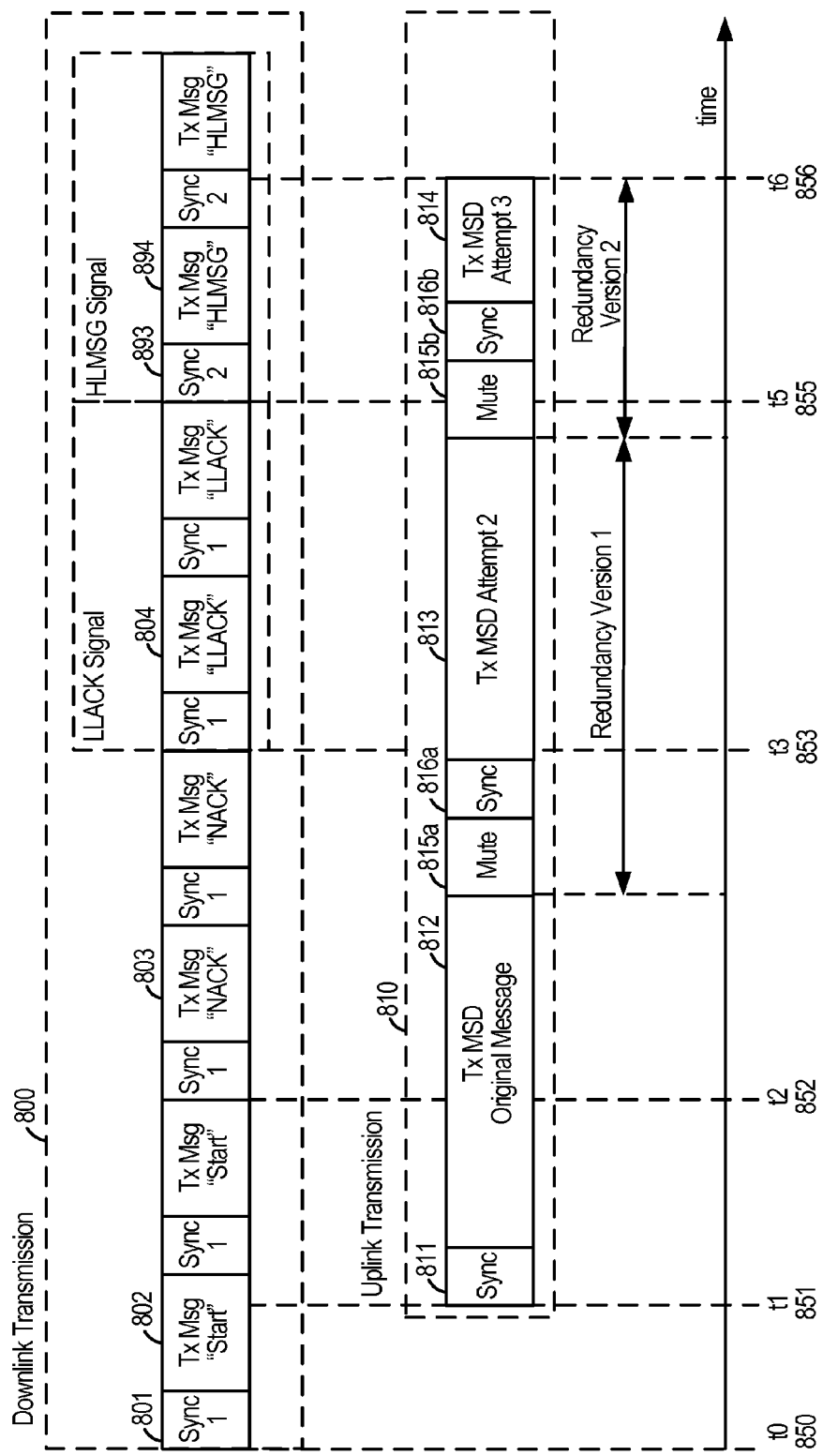
FIG. 14b is a diagram of another embodiment of an interaction of a data request sequence transmitted on a downlink in a destination communication terminal and a data response sequence transmitted on an uplink in a source communication terminal with mute, sync, and data comprising each redundancy version.
Figure 14C:
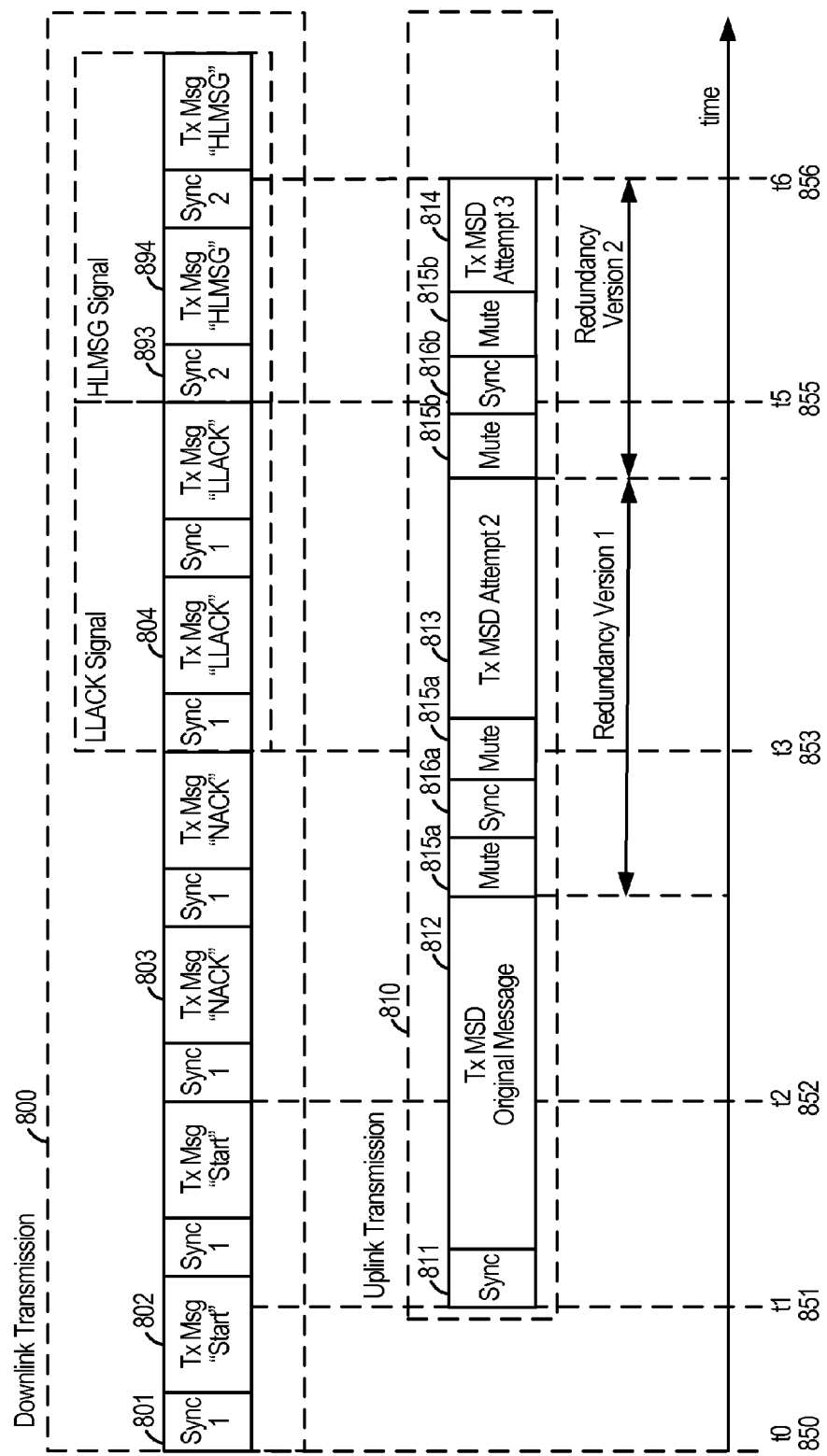
FIG. 14c is a diagram of yet another embodiment of an interaction of a data request sequence transmitted on a downlink in a destination communication terminal and a data response sequence transmitted on an uplink in a source communication terminal with mute, sync, and data comprising each redundancy version.

Referring again to FIG. 7, TxMSD Original Message 812, TxMSD Attempt 1 813, and TxMSD Attempt 2 814 may all be based upon Tx Data S230. Additional TxMSD Attempts may be transmitted (e.g. an Attempt 3). Each TxMSD attempt may incorporate additional Mute and Sync messages and may be referred to as a Redundancy Version, where each Attempt, Mute, and Sync corresponds to a different redundancy version. One suitable example of supporting uplink sync tracking is through the insertion of additional reference pulses during the muting periods. This leaves the modulation frames unchanged, but extends the overall length of each redundancy version. A composite set of Mute, Sync, and Tx Modulated data defining three example Redundancy Versions is shown in FIG. 13. Twu1 701, Tsp1 702, and Td1 703 represent the durations in terms of frames each signal is transmitted in a First Redundancy Version. A suitable example for Twu1 is 2 frames, Tsp1 is 4 frames, and Td1 is 15 frames. Twu2 711, Tsp2 712, and Td2 713 represent the durations in terms of frames each signal is transmitted in a Second Redundancy Version. A suitable example for Twu2 is 4 frames, Tsp2 is 4 frames, and Td2 is 16 frames. Twu3 721, Tsp3 722, and Td3 723 represent the durations in terms of frames each signal is transmitted in a Third Redundancy Version. A suitable example for Twu3 is 2 frames, Tsp3 is 4 frames, and Td3 is 16 frames. A preferred alternative to FIG. 7 of an uplink transmission protocol is shown in FIG. 14a incorporating the composite Sync, Mute, and Data shown in FIG. 13. Alternatively, FIG. 14b and FIG. 14c show different configurations of the Mute and Sync signals (e.g. Mute prior to Sync or Mute/Sync/Mute sequence). The composite Mute, Sync, and Data provide an advantage by enabling a more robust detection and tracking of sample slip conditions. In FIG. 14a-c, TxMSD Original Message 812, TxMSD Attempt 1 813, and TxMSD Attempt 2 814 may all be based upon Tx Data S230. The distinction between the Uplink Transmission of FIGS. 7 and FIG. 14a-c is that Mute 815a, 815b and Sync 816a, 816b are sent along with the TxMSD Attempts to form the Redundancy Versions.

Figure 15:
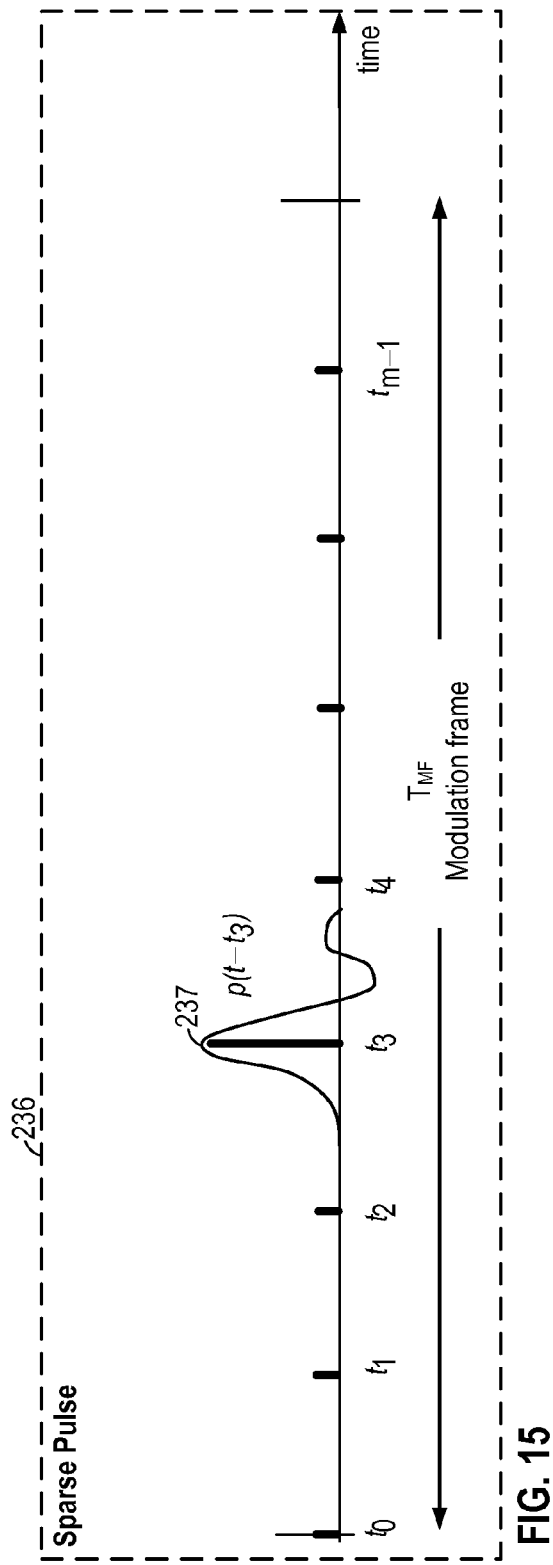
FIG. 15 is a diagram of an embodiment of a sparse pulse data symbol representation.

FIG. 15 shows a suitable example of a Sparse Pulse which may be used to transmit data using a pulse position modulation (PPM) based scheme. The time axis is divided into modulation frames of duration $T_{MF}$. Within each such modulation frame, a number of time instances $t_0, t_1, \ldots, t_1, t_{m-1}$ are defined relative to the modulation frame boundary, which identify potential positions of a basic pulse p(t). For example, the Pulse 237 at position $t_3$ is denoted as $p(t-t_3)$. The Formatted Input Data S220 information bits input to the Modulator 235 are mapped to symbols with corresponding translation to pulse positions according to a mapping table. The pulse may also be shaped with a polarity transform, ±p(t). The symbols may therefore be represented by one of 2 m distinct signals within the modulation frame where m represents the number of time instances defined for the modulation frame and the multiplication factor, 2, represents the positive and negative polarity.

An example of a suitable pulse position mapping is shown in Table 1. In this example, the modulator maps a 3-bit symbol per modulation frame. Each symbol is represented in terms of the position k of the pulse shape p(n–k) and the sign of the pulse. In this example, there are 16 possible shifts of the original transmit pulse within a modulation frame of length 16 samples. Based on an example of 16 possible shifts, Table 1 defines 4 possible PPM positions separated by a predetermined number of time instances each. In this example, the initial offset is set to 1 time instance and the pulses are separated by 4 time instances each, resulting in shifts of 1, 5, 9, and 13 time instances. A total of 8 different pulse position and polarity combinations are mapped to the symbols.

TABLE 1

| Symbol | | Pulse |
|---|---|---|
| decimal | binary | |
| 0 | 000 | p(n-1) |
| 1 | 001 | p(n-5) |
| 2 | 010 | p(n-9) |
| 3 | 011 | p(n-13) |
| 4 | 100 | −p(n-13) |
| 5 | 101 | −p(n-9) |
| 6 | 110 | −p(n-5) |
| 7 | 111 | −p(n-1) |

Modulation-Based Sync Tracking Modulation

The modulation throughput may be reduced for each modulation frame by using uni-polar PPM instead of bipolar PPM. This provides an advantage in compensating for sample slip conditions since the sign bit is now free to be used for sync tracking purposes, when sync tracking is based on the modulation pulses and rather than additional sync sequences. In a suitable example, the PPM symbol mapping is reduced from 3 bits to 2 bits by removing the sign bit as shown in Table 2.

TABLE 2

| Symbol | | Pulse |
|---|---|---|
| decimal | binary | |
| 0 | 00 | p(n-1) |
| 1 | 01 | p(n-5) |
| 2 | 10 | p(n-9) |
| 3 | 11 | p(n-13) |

To compensate for the throughput reduction in using uni-polar PPM, a mixed mode frame format may be used comprised of regular modulation frames (i.e. data frames) and sync tracking modulation frames. In a suitable example, a 2/3 bit mixed mode frame format may be implemented, where regular 3 bit modulation frames and 2 bit tracking modulation frames alternate within a single vocoder frame. In a suitable example, the modulator may use 9 modulation frames per vocoder frame with payload pattern 3/2/3/2/3/2/3/2/3 bit=23 bit per vocoder frame. To further describe the bit breakdown, 5×16 samples/symbol for 3 bit modulation plus 4×20 samples/symbol for 2 bit modulation=160 samples/frame.

Depending on the throughput requirements, a robust modulator or a fast modulator may be used. In a suitable example, the robust modulator uses 5 modulation frames per vocoder frame with payload pattern 2/3/2/3/2 bit=12 bit per vocoder frame With the sign bit available in the case of a uni-polar PPM scheme, the pulses may be modulated by a PN-sequence in order to provide sign randomness. Suitable examples for the PN-sequence may include, but are not limited to the length 15 PN-sequence as described herein, or an additional Gold sequence with increased period length. Gold sequences are well known in the art. Two suitable examples of associating a PN-bit with the four pulse positions in each modulation frame may be implemented.

In a first suitable example, one bit of the PN-sequence may be mapped to the final pulse, irrespective of the actual pulse position within the modulation frame. In a suitable example a length-15 PN sequence is used as described in 242 of FIG. 8A, where the '+' symbols indicate a +1 and the '−' symbols indicate a −1. The PN-sequence of 242 along with a bit index is shown in Table 3.

TABLE 3

| PN Pattern | +1 | +1 | +1 | +1 | −1 | +1 | −1 | +1 | +1 | −1 | −1 | +1 | −1 | −1 | −1 |
|---|---|---|---|---|---|---|---|---|---|---|---|---|---|---|---|
| Bit Index | 0 | 1 | 2 | 3 | 4 | 5 | 6 | 7 | 8 | 9 | 10 | 11 | 12 | 13 | 14 |

An index count tracks the modulation frames, and is based upon the redundancy version, number of frames per redundancy version, data frame number, and tracking modulation frame number. For example, consider a mixed mode configuration with 60 data frames per redundancy version (plus 12 muting frames) and 9 modulation frames per frame, 4 of which are tracking modulation frames. If, for example, the uplink modulator state was in redundancy version 2, data frame 35 within the redundancy version, and tracking modulation frame 3 within the data frame, the tracking index would be (assuming all counts start from 0):

$$index=(2*60+35)*4+3=623$$

The index is taken modulo the PN sequence length, which gives the bit index within the PN pattern. For index 623 and PN length 15, the bit index is 8 (i.e. 623% 15=8). The final transmit pulse is then weighted by the PN-bit sign according to the bit index, in this example +1 according to a bit index of 8 (see Table 3 for the bit index mapping to PN bit pattern).

In a second suitable example, each pulse position within the modulation frame may be assigned a specific PN-sequence. This example may improve the robustness against location ambiguities for boundary slips of more than one sample (e.g. ±3 samples for a sample spacing of 5) by cyclically shifting and sign inverting the original PN-sequence to cover the set of possible pulse positions. This example may resolve offset ambiguities at boundary offsets of the tracking range. In this example, each PPM position has its individual PN pattern and the PN bit sign not only depends on the bit index, but also on the actual 2 bit data depending on the PPM position within the tracking modulation frame. In a suitable example, consider the pattern array used for a length-15 PN sequence (patterns pos 1 to pos 3 resulting from cyclic shifting and, sign inversion of pattern pos 0) as shown in Table 4:

TABLE 4

| PN Pattern Pos 0 | +1 | +1 | +1 | +1 | −1 | +1 | −1 | +1 | +1 | −1 | −1 | +1 | −1 | −1 | −1 |
| --- | --- | --- | --- | --- | --- | --- | --- | --- | --- | --- | --- | --- | --- | --- | --- |
| PN Pattern Pos 1 | +1 | −1 | +1 | −1 | −1 | +1 | +1 | −1 | +1 | +1 | +1 | −1 | −1 | −1 | −1 |
| PN Pattern Pos 2 | +1 | −1 | −1 | +1 | −1 | −1 | −1 | +1 | +1 | +1 | +1 | −1 | +1 | −1 | +1 |
| PN Pattern Pos 3 | +1 | +1 | +1 | −1 | −1 | −1 | −1 | +1 | −1 | +1 | −1 | −1 | +1 | +1 | −1 |
| Bit Index | 0 | 1 | 2 | 3 | 4 | 5 | 6 | 7 | 8 | 9 | 10 | 11 | 12 | 13 | 14 |

In Table 4, the four positions relate to the 2 bit example pulse shown in Table 2. The PN pattern for Pos 0 is the length-15 PN sequence as described in 242, where the '+' symbols indicate a +1 and the '−' symbols indicate a −1. The PN pattern for Pos 1 is the Pos 0 pattern shifted left by 4 bits and then inverted. The PN pattern for Pos 2 is the Pos 0 pattern shifted left by 8. The PN pattern for Pos 3 is the Pos 0 pattern shifted left by 12 bits and then inverted. If, as in the previous example, the bit index was 8 then for PPM position 3, for example, the PN-bit sign is −1, which in turn defines the weighting of the transmit pulse corresponding to PPM position 3.

The pulse shown in FIG. 15 may be additionally shaped according to a shaping function. A suitable example of a shaping function is a root-raised cosine transform of the form:

$$r(t) = \begin{cases} 1 - \beta + \dfrac{4\beta}{\pi}, & t = 0 \\ \dfrac{\beta}{\sqrt{2}}\left[\left(1 + \dfrac{2}{\pi}\right)\sin\left(\dfrac{\pi}{4\beta}\right) + \left(1 - \dfrac{2}{\pi}\right)\cos\left(\dfrac{\pi}{4\beta}\right)\right], & t = \pm\dfrac{T_s}{4\beta} \\ \dfrac{\sin\left[\pi\dfrac{t}{T_s}(1-\beta)\right] + 4\beta\dfrac{t}{T_s}\cos\left[\pi\dfrac{t}{T_s}(1+\beta)\right]}{\pi\dfrac{t}{T_s}\left[1 - \left(4\beta\dfrac{t}{T_s}\right)^2\right]}, & \text{otherwise} \end{cases}$$

where β is the roll-off factor, $1/T_s$ is the maximum symbol rate, and t is the sampling time instance. It should be recognized that the transform may be shortened or lengthened for different variants of modulation frame sizes.

In a suitable example, the transmission pulse may be adjusted for improved localization, which may be achieved by setting one or more samples that surround the pulse maximum to zero. In a suitable example, the pulses adjacent to the maximum in a root raised cosine transform are set to zero.

The PPM spacing may be extended in order to avoid potential detection ambiguities with sample offsets in the range [−M, . . . ,+M]. In a suitable example the PPM spacing may be increased from 4 samples to 5 samples. In a suitable example, the modulation frame has a length of 20 samples and one vocoder frame contains 8 modulation frames (instead of 10 as for the original PPM spacing).

Modulation-Based Sync Tracking Demodulation

Figure 16A:
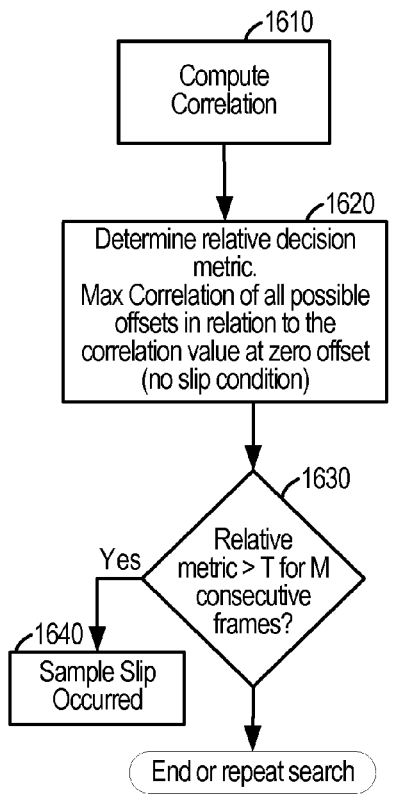
FIG. 16A is a flowchart of an uplink synchronization demodulator.

To detect a sample offset, the demodulator may compute a pulse correlation for all possible sample offsets in the target range [−N, . . . +N]. This target range may correspond to calculating the PPM spacing divided by two and taking the smallest integer not less than the result (i.e. mathematical "ceiling" function) In a suitable example with a sample spacing of 5, the target range is [−3, . . . +]. The demodulator may use a matched filter matched to the pulse shape. A diagram of a suitable example of a sample slip detector is shown in FIG. 16A. A correlation is computed in 1610. Then a relative decision metric is determined in 1620. The decision metric is advantageous in that it maximizes the detection rate and minimizes the probability of false alarm. The relative metric is represented by the maximum correlation of all possible offsets determined relative to the correlation value at the zero offset, where the zero offset represents a no slip condition. Next the relative metric is compared against a threshold for M consecutive frames in 1630. A suitable example for M is 40-50 modulation frames. If the relative metric is greater than a threshold (T) for M consecutive frames, then a sample slip is declared in 1640, otherwise the detector ends or repeats the search. A sample slip declaration in 1640 indicates that the correlation has moved off the zero offset and that a slip has occurred. In an alternate embodiment, the relative metrics determined for the current and subsequent frames are compared and if they fall within a predetermined range of each other, then a sample slip is declared. In a suitable example, a plurality of decision differences is computed wherein the decision difference is based on comparing the maximum correlation of all possible offsets in the frame relative to the correlation at zero offset. If the decision differences fall within a predetermined range then a sample slip condition is declared. In an alternate embodiment, the relative metrics determined for the current and subsequent frames are compared and are ignored if they fall outside a predetermined range.

Figure 16B:
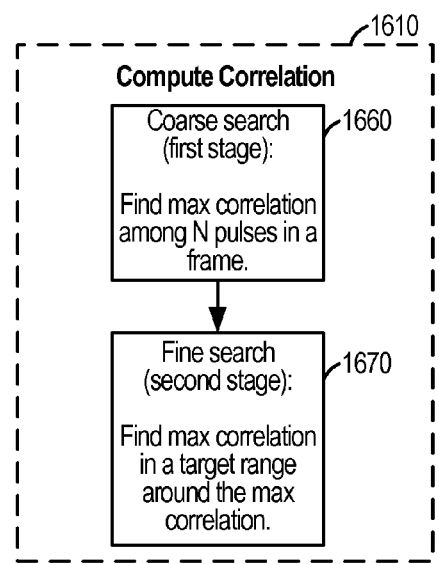
FIG. 16B is a flowchart of a first correlation computation for an uplink synchronization demodulator.
Figure 16D:
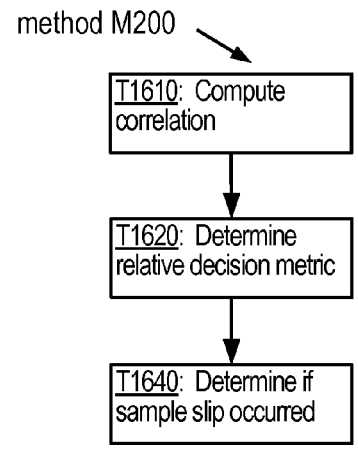
FIG. 16D is a flowchart of a method M200 of an uplink synchronization demodulator.

FIG. 16D shows a flowchart for a method M200 of an example sample slip detector according to a first configuration. Task T1610 computes a correlation. Task 1620 determines a relative decision metric. Task 1640 determines if a sample slip occurred by comparing the relative metric against a threshold for M consecutive frames.

Figure 16E:
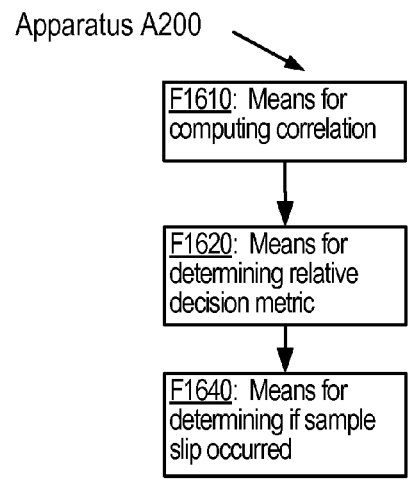
FIG. 16E is a flowchart of a first set of means of an apparatus A200 according to a first configuration of an uplink synchronization demodulator.

FIG. 16E shows a block diagram of an apparatus A200. Apparatus A200 includes means F1610 for computing a correlation, means F1620 for determining a relative decision metric, and means F1640 for determining if a sample slip occurred by comparing the relative metric against a threshold for M consecutive frames.

One problem in finding the correlation maximum among all possible sample offsets is that the PPM position chosen at the transmitter are unknown at the receiver side apriori. Two suitable examples solve the problem in finding the correlation. In a first suitable example to compute correlation 1610, a two stage search is carried out to determine the most likely pulse position and sample offset, where the first stage determines the correlation maximum among a plurality of pulse positions for each offset, and the second stage finds the correlation maximum among all the possible offsets in a target range around the first stage correlation maxima. A diagram of the two stage search is shown in FIG. 16B. A coarse search is performed in step 1660 where the maximum correlation among N pulses is found in a frame. A suitable example for N is 4. Then a fine search is performed in step 1670 where a vector of possible correlation maxima is computed, one maximum for each of the sample offsets within the tracking range. This step is performed among the N possible PPM positions for a given offset. In a suitable example, if the tracking range was [−3 . . . +3], then this step will provide 7 possible correlation maxima. Next, a global correlation maximum is identified within the vector of possible correlation maxima. The associated sample offset is then input to the slip detection logic.

Figure 16C:
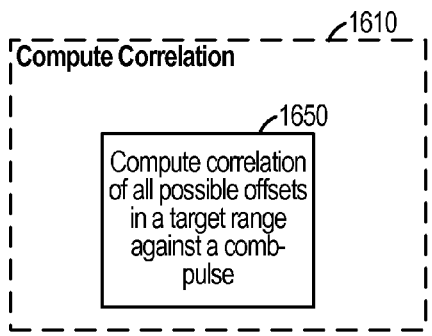
FIG. 16C is a flowchart of a second correlation computation for an uplink synchronization demodulator.
Figure 17A:
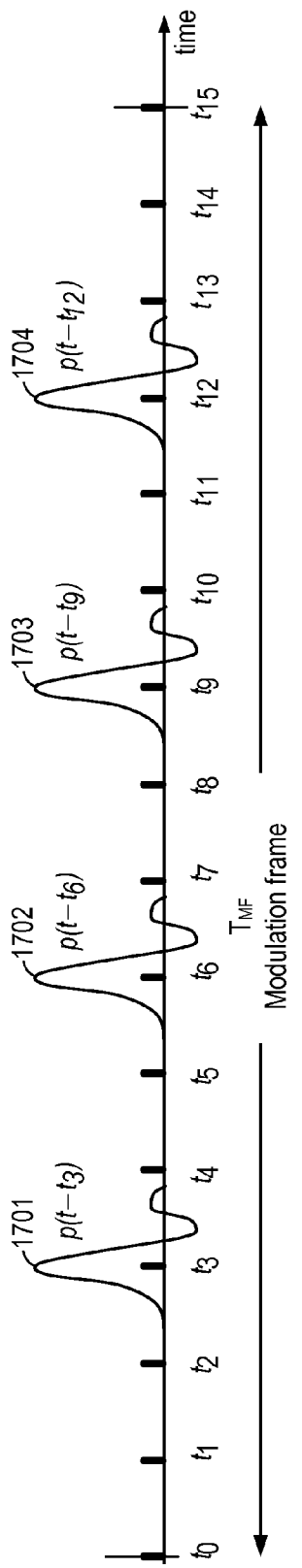
FIG. 17A is a diagram of an embodiment of a comb pulse.
Figure 17B:
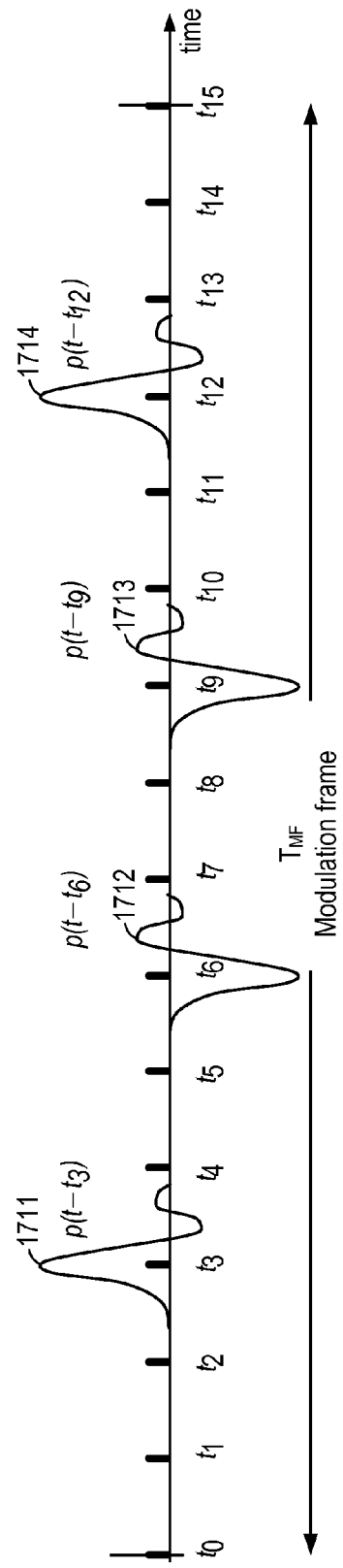
FIG. 17B is a diagram of another embodiment of a comb pulse.
Figure 18A:
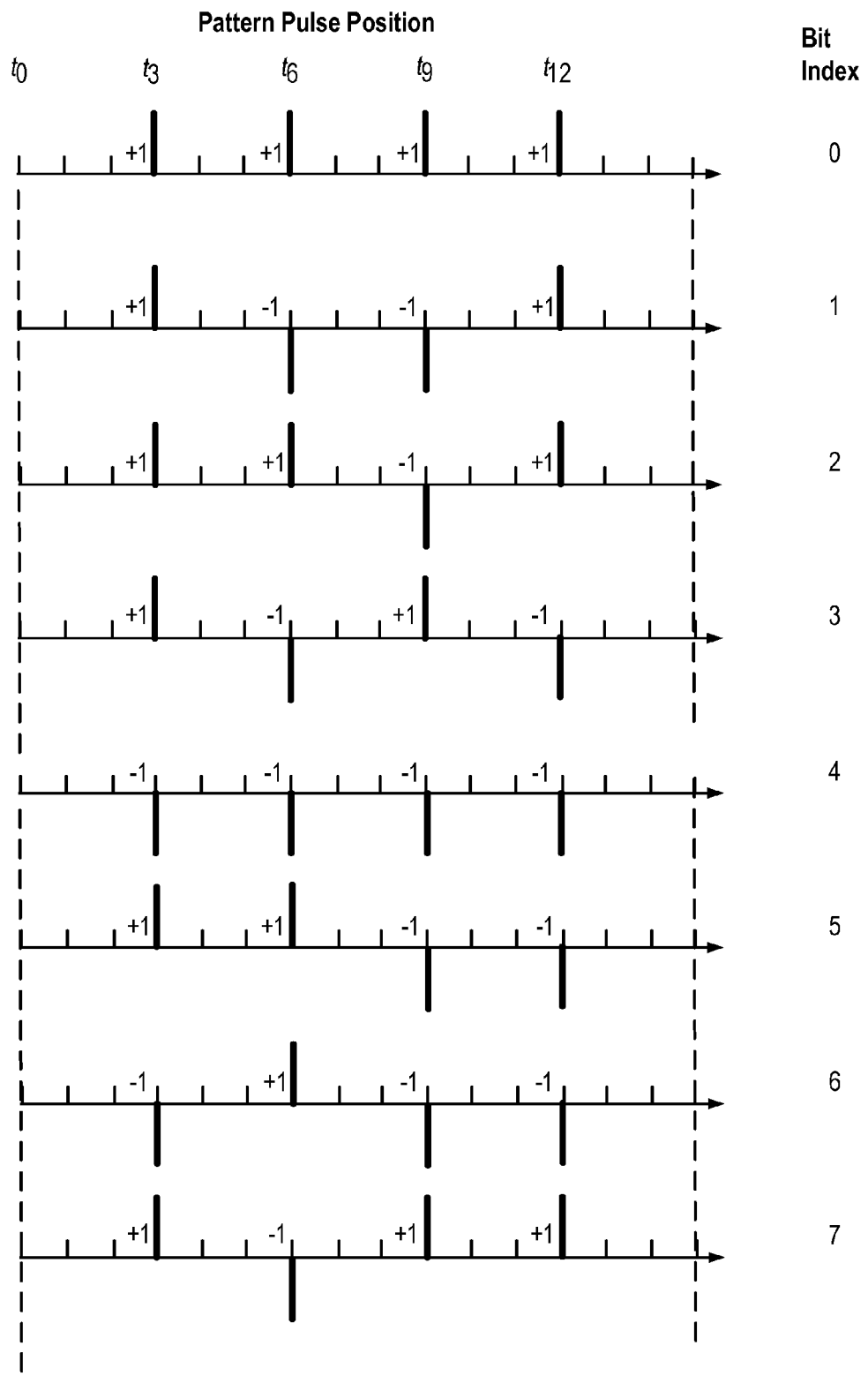
FIG. 18A is a diagram of a series of comb pulses formed with a length 15 PN weighting sequence indices 0 through 7.
Figure 18B:
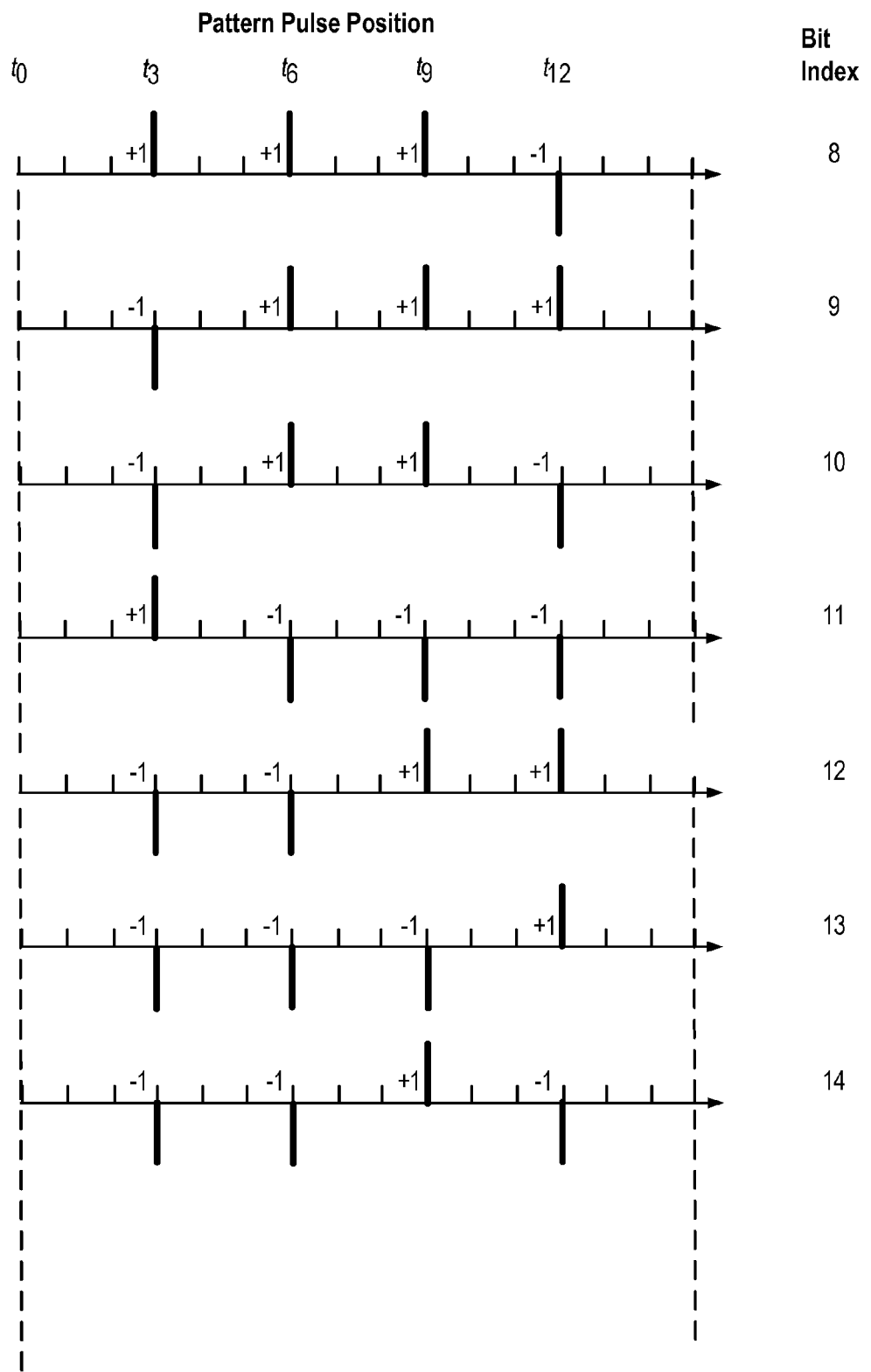
FIG. 18B is a diagram of a series of comb pulses formed with a length 15 PN weighting sequence indices 8 through 14.

In a second suitable example to compute correlation 1610, all matched filter pulses (which are cyclically shifted versions of the original pulse) may be superimposed to form a single "comb" reference pulse that enables computation of the correlations. A diagram of the comb pulse based search is shown in FIG. 16C. The correlation is computed for all possible offsets in a target range against the comb pulse 1650. A suitable example for a target range is [−3, . . . +3] corresponding to a sample spacing of at least 5. A diagram of an example comb pulse is shown in FIG. 17A for a 2 bit (four position) pulse. The comb-matched filter pulse is formed by superimposing these four matched-filter pulses. In a suitable example, the pulses incorporate the PN-bit signs according to the PN pattern tables (e.g. Table 3 or Table 4). This means that for a length-15 PN sequence, there are fifteen different comb matched-filter pulses corresponding to PN-bit index 0 to 14. For example, FIG. 17A represents the comb pulses for bit 0 index (pos 0 . . . pos 4) of Table 4, where pulse 1701 represents pos 0, 1702 represents pos 1, 1703 represents pos 2, and 1704 represents pos 3. Similarly, FIG. 17B represents the comb pulses for bit index 1 in Table 4, where pulse 1711 represents pos 0, 1712 represents pos 1, 1713 represents pos 2, and 1714 represents pos 3. A complete mapping of bit indices to generate the comb pulses for Table 4 is shown in FIG. 18A (bit indices 0-7) and FIG. 18B (bit indices 8-14).

Figure 19A:
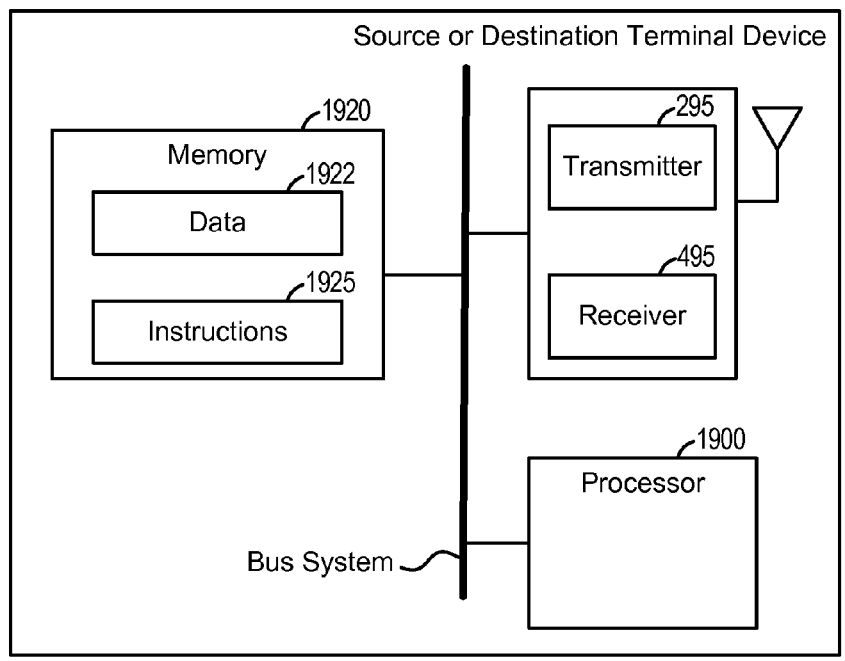
FIG. 19A is a block diagram of an implementation of an apparatus according to a first configuration.

FIG. 19A shows a block diagram of an implementation of apparatus A100 (i.e. Sync Sequence-based sync tracking algorithm) and A200 (i.e. modulation-based sync tracking algorithm), according to a second configuration. Processor 1900 is in communication with Memory 1920, Transmitter 295 and Receiver 495. Memory 1920 includes data 1922 and instructions 1925 which when executed by Processor 1900 executes a Sync Sequence-based sync tracking algorithm to: receive a sync signal, correlate the received sync signal with a reference signal, determine if synchronization is locked, and compute a reference peak shape by combining all valid peaks. Alternatively, Processor 1900 is in communication with Memory 1920, Transmitter 295 and Receiver 495, wherein Memory 1920 includes additional data 1922 and instructions 1925 which when executed by Processor 1900 executes a modulation-based sync tracking algorithm to: compute a correlation by a two-step coarse and fine search process, compute a correlation by correlating all possible offsets against a reference comb pulse, determine a relative decision metric by computing a maximum correlation of all possible offsets relative to a correlation at zero offset, determine if the relative decision metric is greater than a metric for M consecutive frames, and determine that a sample slip occurred.

Figure 19B:
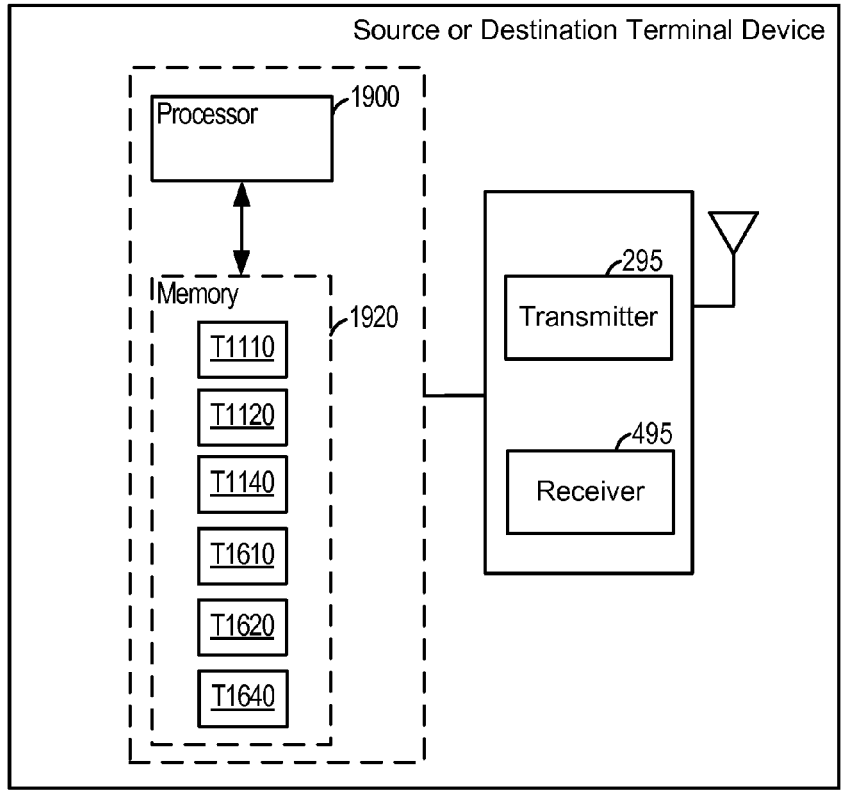
FIG. 19B is a block diagram of an implementation of an apparatus according to a second configuration.

FIG. 19B shows a block diagram of an implementation of apparatus A100 (i.e. Sync Sequence-based sync tracking algorithm) and A200 (i.e. modulation-based sync tracking algorithm), according to a third configuration. Processor 1900 is in communication with Memory 1920, Transmitter 295 and Receiver 495. Memory 1920 includes tasks which when executed by Processor 1900 executes a Sync Sequence-based sync tracking algorithm to: receive a sync signal as described herein with reference to task T1110 and implementation of means F1110, correlate the received sync signal with a a reference signal as described herein with reference to task T1120 and implementation of means F1120, and compute a reference peak shape by combining all valid peaks as described herein with reference to task T1140 and implementation of means F1140. Alternatively, Processor 1900 is in communication with Memory 1920, Transmitter 295 and Receiver 495, wherein Memory 1920 includes additional tasks which when executed by Processor 1900 executes a modulation-based sync tracking algorithm to: compute a correlation by a two-step coarse and fine search process, compute a correlation by correlating all possible offsets against a reference comb pulse as described herein with reference to task T1610 and implementation of means F1610, determine a relative decision metric by computing a maximum correlation of all possible offsets relative to a correlation at zero offset as described herein with reference to task T1620 and implementation of means F1620, determine if the relative decision metric is greater than a metric for M consecutive frames as described herein with reference to task T1640 and implementation of means F1640. One skilled in the art will recognize that a subset of tasks may exist in Memory 1920.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various elements of an implementation of an apparatus as disclosed herein may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a high protocol messaging procedure, such as a task relating to another operation of a device or system in which the processor is embedded. It is also possible for part of a method as disclosed herein to be performed by a first processor and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EE-PROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An illustrative controlling apparatus is coupled to the controlled system. The controlled system contains modules for instructing the controlled system to perform operations described in connection with the configurations disclosed herein. The modules may be implemented as instruction modules that are encoded into the controlling apparatus. A controlling apparatus may be RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art.

It is noted that the various methods disclosed herein may be performed by an array of logic elements such as a processor, and that the various elements of an apparatus as described herein may be implemented as modules designed to execute on such an array. As used herein, the term "module" or "submodule" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP).

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

The invention claimed is:

1. A method for identifying a sample slip in the transmission channel of an in-band modem comprising:
receiving a data bit, wherein the received data bit comprises a pulse positioned at one of a plurality of predetermined locations in a frame;
correlating the received data bit with a reference signal; and
identifying a sample slip based on the correlating,
wherein the correlating comprises a two-stage search,
wherein a first stage of the two-stage search comprises finding a plurality of possible maximum correlations within a first predetermined range around each of a first predetermined number of pulses in a frame, and
wherein a second stage of the two-stage search comprises finding the maximum correlation among the possible maximum correlations.

2. The method of claim 1, wherein the identifying comprises:
determining a decision metric for a current frame, wherein the decision metric comprises determining the maximum correlation of all possible offsets in the frame relative to the correlation at zero offset;
determining the decision metric for a first predetermined number of subsequent frames;
determining if the decision metrics determined for the current and subsequent frames is larger than a second predetermined value; and
identifying a sample slip based on the determining if the decision metrics determined for the current and subsequent frames is larger than the second predetermined value.

3. The method of claim 1, wherein the identifying comprises:
determining a decision metric for a current frame, wherein the decision metric comprises determining the maximum correlation of all possible offsets in the frame relative to the correlation at zero offset;
determining the decision metric for a first predetermined number of subsequent frames;
comparing the decision metrics determined from the current and subsequent frames to generate a plurality of decision differences;
determining if the decision differences fall within a first predetermined range; and
identifying a sample slip based on the determining if the decision differences fall within the first predetermined range.

4. The method of claim 3, wherein the identifying further comprises ignoring frames which has a decision difference falling below a third predetermined threshold.

5. The method of claim 1 wherein the reference signal comprises a comb pulse, wherein the comb pulse is comprised of a plurality of superimposed pulses.

6. An apparatus for identifying a sample slip in the transmission channel of an in-band modem comprising:
a receiver for receiving a data bit, wherein the received data bit comprises a pulse positioned at one of a plurality of predetermined locations in a frame;
a correlator for correlating the received data bit with a reference signal and
a processor for identifying a sample slip based on the correlating
wherein the correlator comprises a two-stage searcher, wherein a first stage of the two-stage searcher comprises finding a plurality of possible maximum correlations within a first predetermined range around each of a first predetermined number of pulses in a frame, and wherein a second stage of the two-stage searcher comprises finding the maximum correlation among the possible maximum correlations.

7. The apparatus of claim 6, wherein the identifying by the processor further comprises:

determining a decision metric for a current frame, wherein the decision metric comprises determining the maximum correlation of all possible offsets in the frame relative to the correlation at zero offset;

determining the decision metric for a first predetermined number of subsequent frames;

determining if the decision metrics determined for the current and subsequent frames is larger than a second predetermined value; and identifying a sample slip based on the determining if the decision metrics determined for the current and subsequent frames is larger than the second predetermined value.

8. The apparatus of claim 6, wherein the identifying by the processor further comprises:

determining a decision metric for a current frame, wherein the decision metric comprises determining the maximum correlation of all possible offsets in the frame relative to the correlation at zero offset;

determining the decision metric for a first predetermined number of subsequent frames; comparing the decision metrics determined from the current and subsequent frames to generate a plurality of decision differences;

determining if the decision differences fall within a first predetermined range; and identifying a sample slip based on the determining if the decision differences fall within the first predetermined range.

9. The apparatus of claim 8, wherein the identifying by the processor further comprises ignoring frames which has a decision difference falling below a third predetermined threshold.

10. The apparatus of claim 6, wherein the reference signal comprises a comb pulse, wherein the comb pulse is comprised of a plurality of superimposed pulses.

11. An apparatus for identifying a sample slip in the transmission channel of an in-band modem comprising:

means for receiving a data bit, wherein the received data bit comprises a pulse positioned at one of a plurality of predetermined locations in a frame;

means for correlating the received data bit with a reference signal; and means for identifying a sample slip based on the correlating, wherein the means for correlating comprises a two-stage search, wherein a first stage of the two-stage search comprises means for finding a plurality of possible maximum correlations within a first predetermined range around each of a first predetermined number of pulses in a frame, and wherein a second stage of the two-stage search comprises means for finding the maximum correlation among the possible maximum correlations.

12. The apparatus of claim 11, wherein the means for identifying comprises:

means for determining a decision metric for a current frame, wherein the decision metric comprises determining the maximum correlation of all possible offsets in the frame relative to the correlation at zero offset;

means for determining the decision metric for a first predetermined number of subsequent frames;

means for determining if the decision metrics determined for the current and subsequent frames is larger than a second predetermined value; and means for identifying a sample slip based on the determining if the decision metrics determined for the current and subsequent frames is larger than the second predetermined value.

13. The apparatus of claim 11, wherein the means for identifying comprises:

means for determining a decision metric for a current frame, wherein the decision metric comprises determining the maximum correlation of all possible offsets in the frame relative to the correlation at zero offset;

means for determining the decision metric for a first predetermined number of subsequent frames;

means for comparing the decision metrics determined from the current and subsequent frames to generate a plurality of decision differences;

means for determining if the decision differences fall within a first predetermined range; and means for identifying a sample slip based on the determining if the decision differences fall within the first predetermined range.

14. The apparatus of claim 13 wherein the means for identifying further comprises means for ignoring frames which has a decision difference falling below a third predetermined threshold.

15. The apparatus of claim 11, wherein the reference signal comprises a comb pulse, wherein the comb pulse is comprised of a plurality of superimposed pulses.

16. A non-transitory memory storing a computer program that, when executed, causes a computer to perform the acts of:

receiving a data bit, wherein the received data bit comprises a pulse positioned at one of a plurality of predetermined locations in a frame;

correlating the received data bit with a reference signal; and identifying a sample slip based on the correlating, wherein the correlating comprises a two-stage search, wherein a first stage of the two-stage search comprises finding a plurality of possible maximum correlations within a first predetermined range around each of a first predetermined number of pulses in a frame, and wherein a second stage of the two-stage search comprises finding the maximum correlation among the possible maximum correlations.

17. The memory of claim 16, further comprising a computer program that, when executed, causes a computer to perform the acts of:

determining a decision metric for a current frame, wherein the decision metric comprises determining the maximum correlation of all possible offsets in the frame relative to the correlation at zero offset;

determining the decision metric for a first predetermined number of subsequent frames;

determining if the decision metrics determined for the current and subsequent frames is larger than a second predetermined value; and identifying a sample slip based on the determining if the decision metrics determined for the current and subsequent frames is larger than the second predetermined value.

18. The memory of claim 16, further comprising a computer program that, when executed, causes a computer to perform the acts of:

determining a decision metric for a current frame, wherein the decision metric comprises determining the maximum correlation of all possible offsets in the frame relative to the correlation at zero offset;

determining the decision metric for a first predetermined number of subsequent frames;

comparing the decision metrics determined from the current and subsequent frames to generate a plurality of decision differences;

determining if the decision differences fall within a first predetermined range; and identifying a sample slip based on the determining if the decision differences fall within the first predetermined range.

19. The memory of claim 18 further comprising a computer program that, when executed, causes a computer to perform the acts of ignoring frames which has a decision difference falling below a third predetermined threshold.

\* \* \* \* \*